US010362278B1

(12) United States Patent
Palazzolo et al.

(10) Patent No.: US 10,362,278 B1
(45) Date of Patent: Jul. 23, 2019

(54) FIREARM ENVIRONMENTAL RECORDING APPARATUS AND SYSTEM

(71) Applicant: Barnes & Palazzolo LLC, Pooler, GA (US)

(72) Inventors: Jason Palazzolo, Pooler, GA (US); Kevin Barnes, Douglasville, GA (US)

( * ) Notice: Subject to any disclaimer, the term of this patent is extended or adjusted under 35 U.S.C. 154(b) by 0 days.

(21) Appl. No.: 15/887,999

(22) Filed: Feb. 3, 2018

Related U.S. Application Data

(63) Continuation-in-part of application No. 14/929,301, filed on Oct. 31, 2015, now abandoned.

(60) Provisional application No. 62/075,541, filed on Nov. 5, 2014, provisional application No. 62/552,959, filed on Aug. 31, 2017.

(51) Int. Cl.
*H04N 7/18* (2006.01)
(52) U.S. Cl.
CPC .................. *H04N 7/185* (2013.01)
(58) Field of Classification Search
CPC ............ H04N 7/185; F41G 1/00; F41G 1/378
See application file for complete search history.

(56) References Cited

U.S. PATENT DOCUMENTS

| 2003/0101632 | A1* | 6/2003 | Davenport | F41G 11/004 42/85 |
| 2012/0327247 | A1* | 12/2012 | Mironichev | F41G 1/32 348/164 |
| 2018/0096752 | A1* | 4/2018 | Ovalle | G06Q 50/34 |

* cited by examiner

*Primary Examiner* — Tracy Y. Li
(74) *Attorney, Agent, or Firm* — Patentfile, LLC; Bradley C. Fach; Steven R. Kick

(57) ABSTRACT

A firearm environmental recording apparatus, which may be used with a firearm environmental recording system, may include: a firearm attachment structure configured to attach to portions of a firearm; a processing unit; a camera configured to record image data; a microphone configured to record audio data; and an inertial sensor module configured to provide to orientation data. The image data, audio data, and orientation data may be associated with and/or stored in a database, such as a blockchain database of a blockchain network, so that a chain of trust and the integrity of data recorded by the one or more firearm environmental recording apparatuses is maintained and accessible in a secure unalterable state. Nodes of the blockchain network may include client devices, servers, and firearm environmental recording apparatuses, and tokens of a cryptocurrency may be provided to nodes for performing data transactions in the blockchain database.

20 Claims, 14 Drawing Sheets ically, this patent
FIREARM ENVIRONMENTAL RECORDING APPARATUS AND SYSTEM

CROSS REFERENCE TO RELATED APPLICATIONS

This application is a continuation-in-part of U.S. Non-Provisional application Ser. No. 14/929,301, filed on Oct. 31, 2015, entitled "FIREARM ENVIRONMENTAL RECORDING APPARATUS", which claims priority to U.S. Provisional Application No. 62/075,541, filed on Nov. 5, 2014, entitled "FIREARM ENVIRONMENTAL RECORDING APPARATUS", the entire disclosures of which are incorporated by reference herein. This application also claims the benefit of U.S. Provisional Patent Application Ser. No. 62/552,959, filed on Aug. 31, 2017, entitled "PLATFORM FOR FACILITATING CONNECTIVITY OF SMART-FIREARMS", the entire disclosures of which are incorporated by reference herein.

FIELD OF THE INVENTION

This patent specification relates to the field of recording apparatuses and systems. More specifically, this patent specification relates to recording apparatuses and systems configured to record the environment around a firearm.

BACKGROUND

Events where firearms are used in self-defense are more common than you may think, and unfortunately, many of these gun-related incidents go un-witnessed. Without concrete evidence, determining whether the firearm was used in self defense or in aggression is not an easy task. To date, forensics and eye witness accounts have not always provided the full picture, leaving too many details of an event up to speculation.

The increased tensions created by firearm related deaths, as well as the sheer volume of firearm related incidents has created a social divide and a large grey area in social accountability pertaining to firearms as a whole. When firearms are involved in an event, whether they are discharged or simply drawn, the personal point of view of an observer can influence the observer's account of that event. Observers are frequently disposed to give an account of an event that portrays them in an overly positive manner or someone else in an overly negative manner. Without a way to replay every detail of a situation there is more potential for unjust sentencing, causing uproar throughout the nation, or leaving the defendants reputation ruined.

The observer's account may also be influenced by the amount of time that transpired between the event and the time that their account of that event is given. The observer may mull over the event in their mind or receive influence from a third party which may cause the observer's account to become biased. Furthermore, if picked up by the media, the observer's account of an event may be distorted or the observer may falsify their account for various reasons.

Accordingly, smart firearms have been developed, which include processing capability, computer memory storing program instructions, communication devices and a locking mechanism. The smart firearms provide increased security. The smart firearms may be able to store usage data and environment data. Further, the smart firearms may be able to share the stored data with external systems. However, there are concerns related to securely and reliably connect smart firearms with external computer networks.

The effects of inaccurate accounts of events in which firearms were involved are felt on both sides of the issue and cross over both the private and public/governmental sectors. Therefore, a need exists for novel apparatuses and systems which can record an unbiased account of an event. There also exists a need for novel apparatuses and systems which are configured to record a plurality of variables in an environment around a firearm. A need also exists for a firearm environmental recording apparatus that attaches directly to a firearm giving it the ability to see, hear, feel and remember any situation to function as a black box for the firearm. There exists a further need for a firearm environmental recording apparatus and system which is able to capture every aspect of any given situation and in cases of self defense, its data can be used to recreate the actions and events leading up to, and after discharge of a firearm. There also exists a need for novel apparatuses and systems which are able to transfer a recorded event to other electronic devices. Finally, there exists a need for novel apparatuses and systems that enable secure and reliable connection of smart firearms amongst themselves and with computer networks.

BRIEF SUMMARY OF THE INVENTION

A firearm environmental recording system and apparatus are disclosed which provide and incorporate an innovative database technology that improves the functioning of networked computers and firearm environmental recording apparatuses so that data recorded by the firearm environmental recording apparatuses is maintained and accessible in a secure unalterable state.

In some embodiments, a firearm environmental recording apparatus may include: a processing unit having a processor, network interface, and a memory; a camera in communication with the processing unit, the camera configured to record image data; a microphone in communication with the processing unit, the microphone configured to record audio data; an inertial sensor module in communication with the processing unit, the inertial sensor module configured to provide to orientation data; a blockchain database of a blockchain network, the blockchain database stored in the memory; communication logic stored in the memory, executable by the processor and configured to communicate the image data, audio data, and orientation data to the blockchain network via the network interface; and a firearm attachment structure configured to attach to portions of a firearm, the firearm attachment structure comprising a first rail receiver and a second rail receiver, wherein the body is removably coupled to the firearm attachment structure.

According to another aspect consistent with the principles of the invention, a firearm environmental recording system is disclosed which may provide a chain of trust and the integrity of data recorded by the one or more firearm environmental recording apparatuses is provided. In some embodiments, the system may include a blockchain database maintained by a blockchain network and one or more firearm environmental recording apparatuses which may be in communication with the blockchain network. The blockchain network may include two or more nodes, and each node may have a processing unit having a processor, network interface, and a memory. A firearm environmental recording apparatus may include: a processing unit having a processor, network interface, and a memory; a camera in communication with the processing unit, the camera configured to record image data; a microphone in communication with the processing unit, the microphone configured to record audio data; an inertial sensor module in communication with the processing unit, the inertial sensor module configured to provide to orientation data; a body housing the camera; and a firearm attachment structure coupled to the body and configured to attach to portions of a firearm, the firearm attachment structure comprising a first rail receiver and a second rail receiver. The system may further comprise a communication logic and a virtual machine logic. A communication logic may be stored in the memory of a firearm environmental recording apparatus, and the communication logic may be executable by the processor of the firearm environmental recording apparatus and configured to communicate the image data, audio data, and orientation data to the blockchain network via the network interface. A virtual machine logic may be stored in a memory, of a node, such as a server, client device, or firearm environmental recording apparatus, and the virtual machine logic may be executable by a processor and configured to incorporate image data, audio data, and orientation data into the blockchain database.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
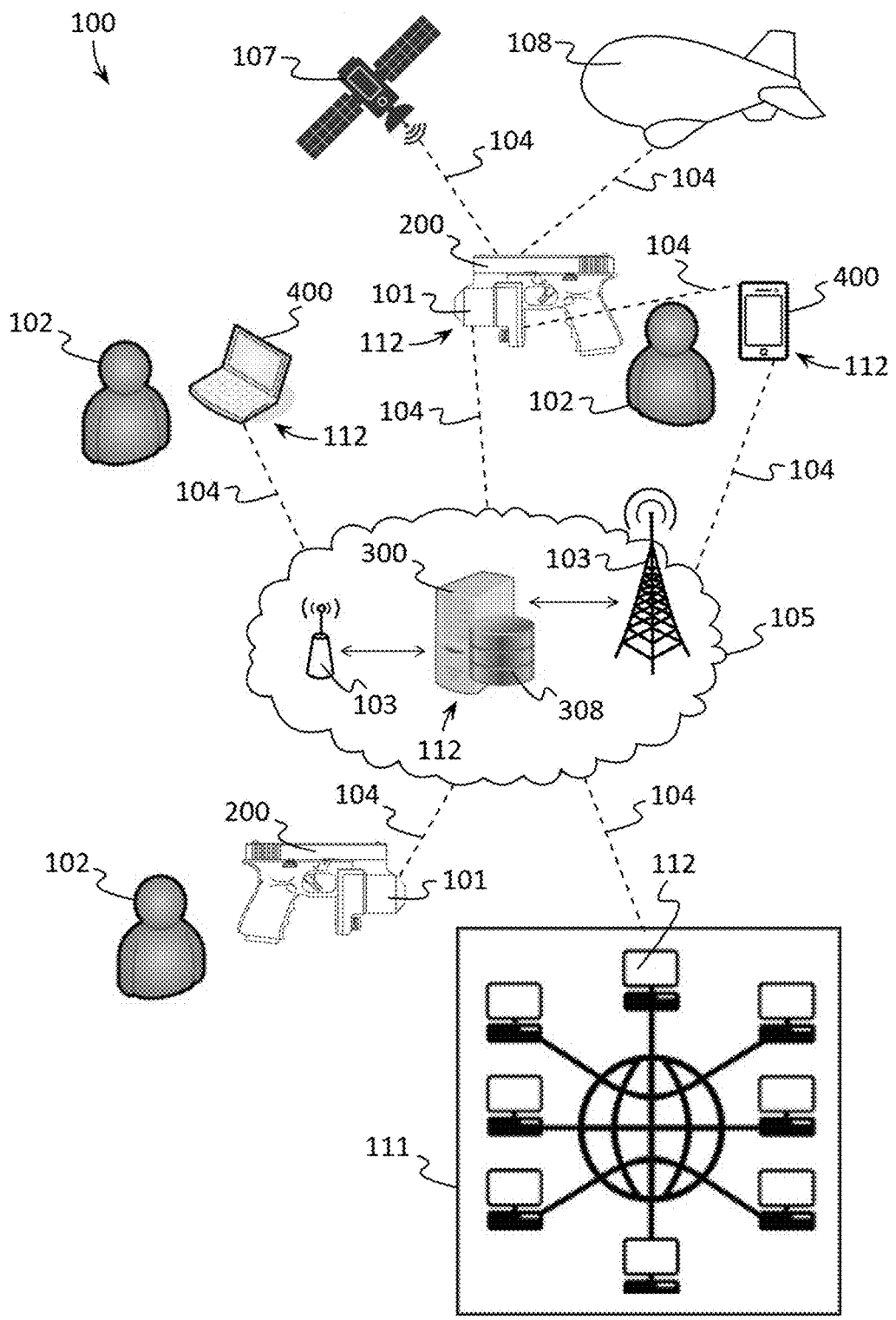
FIG. 1 depicts an illustrative example of some of the components and computer implemented methods which may be found in a firearm environmental recording system according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of electronic device comprising circuitry and configured to generally perform functions such as recording audio, photos, videos, telemetry, energy and light data; displaying or reproducing audio, photos, videos, telemetry, energy and light data; storing, retrieving, or manipulation of electronic data; providing electrical communications and network connectivity; or any other similar function. Non-limiting examples of electronic devices include; personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include; cell phones, smart phones, smart watches, tablet computers, laptop computers, wearable computers such as watches, Google Glasses, etc. and the like.

The term "client device" as used herein is a type of computer generally operated by a person. In some embodiments, a client device is a smart phone or computer configured to receive and transmit data to a server or other electronic device which may be operated locally or in the cloud. Non-limiting examples of client devices include; personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of client devices which are portable and easily carried by a person from one location to another may sometimes be referred to as a "mobile device" or "portable device". Some non-limiting examples of mobile devices include; cell phones, smart phones, tablet computers, laptop computers, wearable computers such as smart watches, Google Glasses, etc. and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

As used herein, the term "blockchain" shall generally mean a distributed database that maintains a continuously growing ledger or list of records, called blocks, secured from tampering and revision. Every time data may be published to a blockchain database the data may be published as a new block. Each block may include a timestamp and a link to a previous block. Through the use of a peer-to-peer network and a distributed timestamping server, a blockchain database is managed autonomously. Blockchains are an open, distributed ledger that can record transactions between two parties efficiently and in a verifiable and permanent way. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction input results in a different hash value being computed, which indicates potentially compromised transaction input. Digital signatures ensure that transactions originated from senders (signed with private keys) and not imposters. At its core, a blockchain system records the chronological order of transactions with all nodes agreeing to the validity of transactions using the chosen consensus model. The result is transactions that are irreversible and agreed to by all members in the network.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New apparatuses configured to record environmental variables are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. The present invention will now be described by example and through referencing the appended figures representing preferred and alternative embodiments. As perhaps best shown by FIG. 1, examples of some of the physical components which may comprise a firearm environmental recording system ("the system") 100 according to some embodiments are presented. The system 100 is configured to facilitate the transfer of data and information between one or more firearm environmental recording apparatuses 101, access points 103, client devices 400, servers 300, nodes 112, and blockchain networks 111 over a data network 105. Each firearm environmental recording apparatus ("the apparatus") 101, client device 400, node 112, blockchain network 111, and server 300 may send data to and receive data from the data network 105 through a network connection 104 with an access point 103. The system 100 may comprise one or more blockchain databases 113 which may comprise data recorded by an apparatus 101, such as image data, audio data, and orientation data.

In this example, the system 100 comprises at least one client device 400 (but preferably more than two client devices 400) configured to be operated by one or more users 102. Client devices 400 can be any type of mobile computing device, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The system 100 may comprise at least one apparatus 101 (but preferably more than two apparatuses 100) which may be coupled to a firearm 200 and which may be configured to be operated by one or more users 102.

In some embodiments, the system 100 may be configured to facilitate the communication of data recorded an apparatus 101 to and from one or more users 102, through their respective apparatus 101 and/or client device 400 preferably via servers 300. Users 102 of the system 100 may include the owner or operator of a firearm 200, such as a pistol, rifle, shotgun, machine pistol, machine gun, stun gun, non-lethal weapon, etc., in which the firearm 200 is coupled to or comprises an apparatus 101.

In some embodiments, the system 100 may include a blockchain network 111, having one or more nodes 112, which may be in communication with one or more apparatuses 101, servers 300, and/or client devices 400 of the system 100. A node 112 may be a server 300, an apparatus 101, a client device 400, or any other suitable networked computing platform. The blockchain network 111 may manage a distributed blockchain database 113 containing data recorded by the one or more apparatuses 101 of the system 100. The data recorded by the one or more apparatuses 101 may be maintained as a continuously growing ledger or listing of the data recorded by the one or more apparatuses 101, which may be referred to as blocks, secured from tampering and revision. Each block includes a timestamp and a link to a previous block. Through the use of a peer-to-peer blockchain network 111 and a distributed timestamping server 300, a blockchain database 113 may be managed autonomously. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction data input results in a different hash value being computed, which indicates potentially compromised transaction input. Digital signatures ensure that data entry transactions (data added to the blockchain database 113) originated from senders (signed with private keys) and not imposters. At its core, a blockchain database 113 may record the chronological order of data entry transactions with all nodes 112 agreeing to the validity of entry transactions using the chosen consensus model. The result is data entry transactions that are irreversible and agreed to by all members in the blockchain network 111.

The blockchain network 111 may comprise a cryptocurrency or digital asset designed to work as a medium of exchange that uses cryptography to secure its transactions, to control the creation of additional units, and to verify the transfer of assets. Example cryptocurrencies include Bitcoin, Etherium, Ripple, etc. The blockchain network 111 may also comprise tokens common to cryptocurrency based blockchain networks 111. The tokens may serve as a reward or incentive to nodes 112 for blockchain network 111 services and to make the blockchain network 111 attach resistant. The blockchain network 111 may comprise token governance rulesets based on crypto economic incentive mechanisms that determine under which circumstances blockchain network 111 transactions are validated and new blocks are created. Tokens may include usage tokens, work tokens, Intrinsic, Native or Built-in tokens, application token, asset-backed tokens, or any other type of token which may be used in a cryptocurrency network.

In some embodiments, the system 100 may comprise and/or be in communication with one or more earth orbiting satellites 107, such as a network of satellites 107. In further embodiments, the system 100 may comprise and/or be in communication with one or more aircraft 108, such as a network of aircraft 108. Aircraft may include Aerostats (lighter than air aircraft), drones or unmanned air craft, manned aircraft, or any other flying device. In still further embodiments, one or more apparatuses 101 may be in communication with a network 105 provided solely by one or more satellites 107 and/or aircraft 108. In yet further embodiments, one or more apparatuses 101 may be in communication with a network 105 which includes one or more satellites 107 and/or aircraft 108. Optionally, the apparatuses 101, nodes 112, satellites 107 and/or aircraft 108 may be used to produce energy for mining, storage and communications of the data and services of the blockchain network 111. In further embodiments, one or more satellites 107 and/or aircraft 108 may utilize the atomic properties of Earth's atmosphere to do work for the purpose of the blockchain networks 111.

Figure 2:
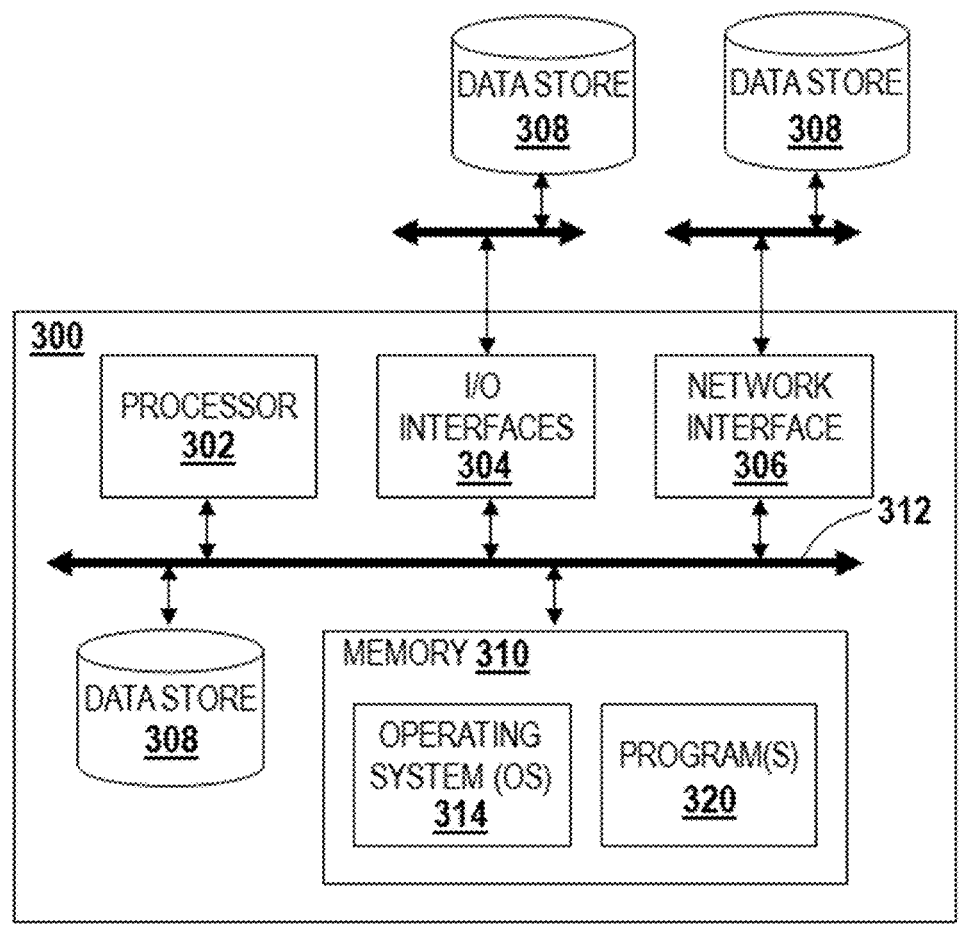
FIG. 2 illustrates a block diagram illustrating an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. In some embodiments, a server 300 may function as or comprise a node 112. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network.

A data store 308 may be used to store data. The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like.

The one or more programs 320 may include a communication engine 151, a virtual machine engine 152, and/or an accounting engine 153, and the programs 320 may be configured to implement the various processes, algorithms, methods, techniques, etc. described herein.

Figure 3:
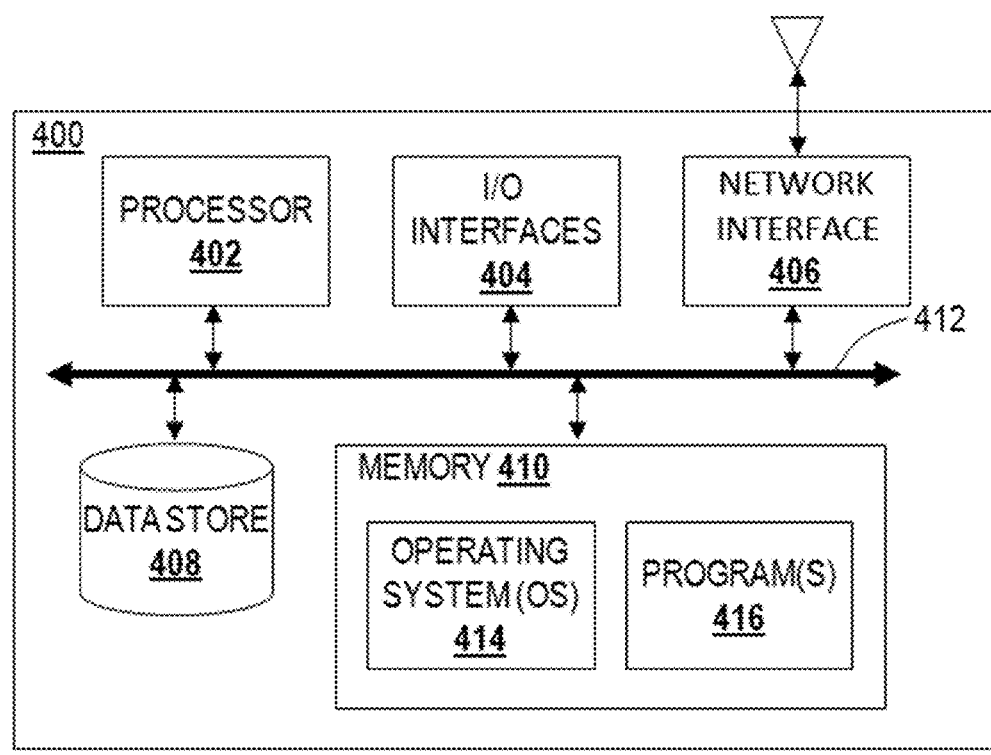
FIG. 3 shows a block diagram illustrating an example of a client device which may be used by the system as described in various embodiments herein.
Figure 4:
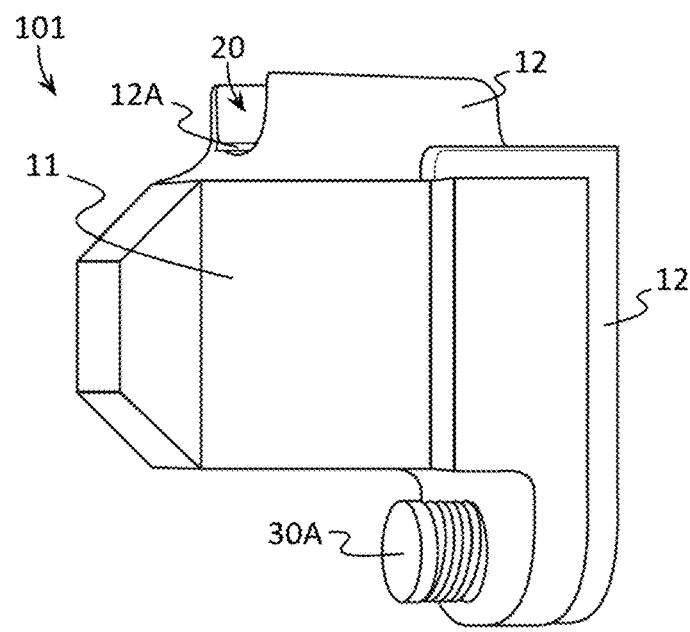
FIG. 4 depicts a front perspective view of a first side of an example of a firearm environmental recording apparatus according to various embodiments described herein.
Figure 5:
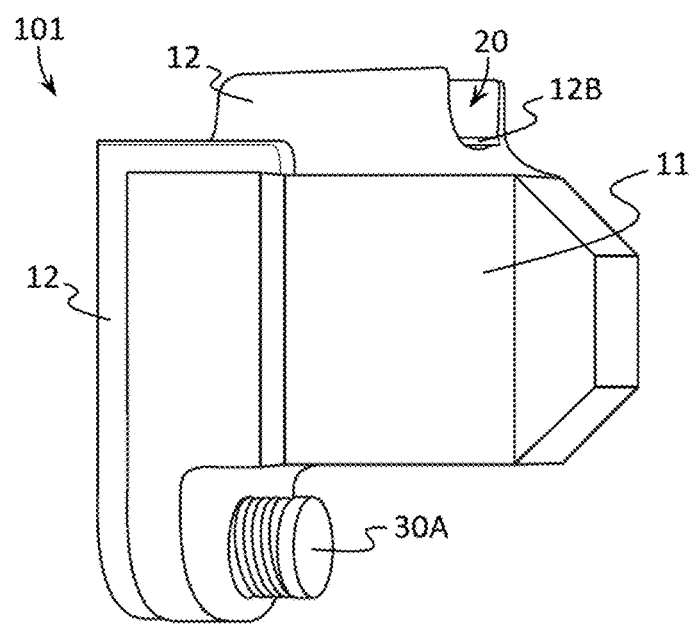
FIG. 5 illustrates a front perspective view of a second side of an example of a firearm environmental recording apparatus according to various embodiments described herein.
Figure 6:
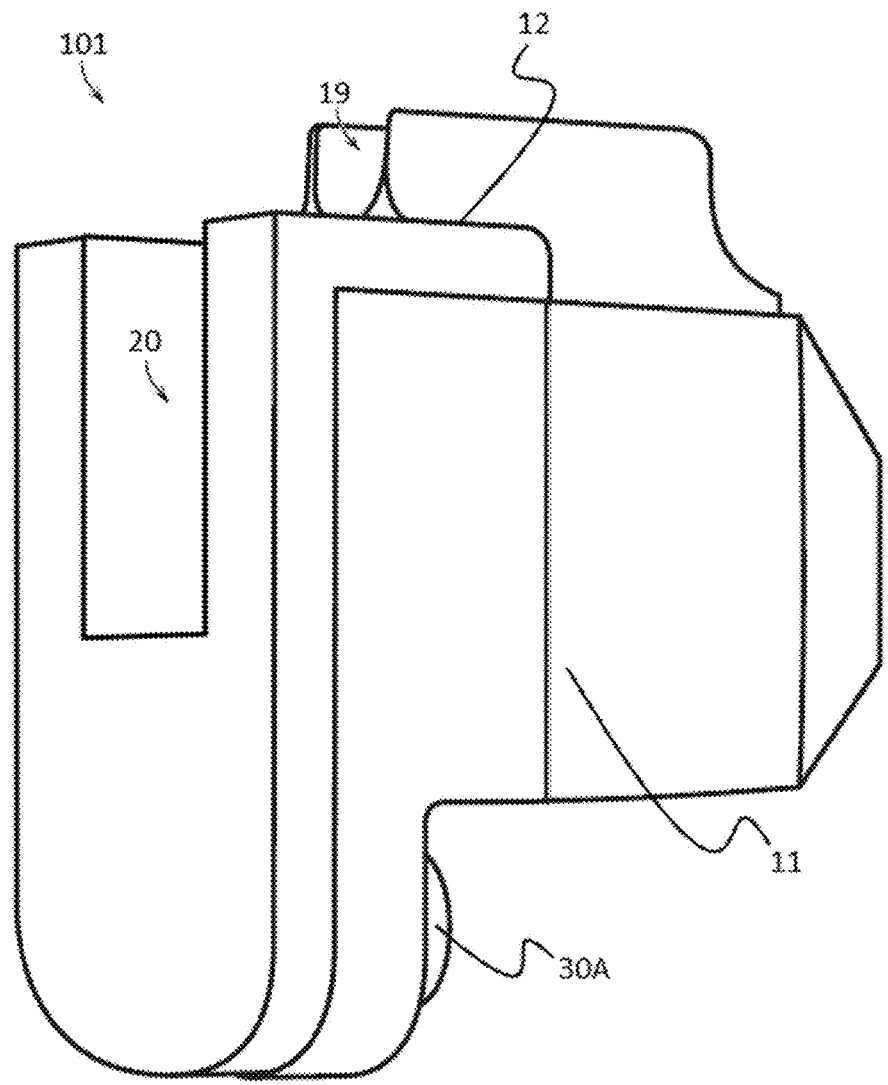
FIG. 6 shows a rear perspective view of an example of a firearm environmental recording apparatus according to various embodiments described herein.

Referring to FIG. 3, in an exemplary embodiment, a block diagram illustrates a client device 400 of which one or more may be used in the system 100 or the like and which may be a type of computing platform. In some embodiments, a client device 400 may function as or comprise a node 112. The client device 400 can be a digital device that, in terms of hardware architecture, generally includes a processor 402, input/output (I/O) interfaces 404, a network interface such as a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User 101 input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400.

The radio 406 enables wired and/or wireless communication to an external access device or network 105. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (Wi-MAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100. Optionally, the programs 420 may include a communication engine 151, a virtual machine engine 152, and/or an accounting engine 153.

Turning now to FIGS. 4-8, an example of a firearm environmental recording apparatus ("the apparatus") 101 and some components of an apparatus 101 according to various embodiments are illustrated. In some embodiments, the apparatus 101 may comprise a substantially rigid body 11 which may be removably coupled to a firearm attachment structure 12. In other embodiments, one or more firearm attachment structures 12 may be removably coupled anywhere on or to the body 11 such as a back surface, a side surface, a bottom surface, a front surface, and/or a top surface the body 11. In some embodiments, one or more elements of the apparatus 101, such as a processing unit 21, processor 22, network interface 23, data store 24, memory 25, local interface 26, and one or more input/output interfaces 30, may be housed, contained, or positioned on the body 11. In further embodiments, one or more elements of the apparatus 101, such as a processing unit 21, processor 22, network interface 23, data store 24, memory 25, local interface 26, and one or more input/output interfaces 30, may be housed, contained, or positioned on the firearm attachment structure 12. In still further embodiments, one or more elements of the apparatus 101, such as a processing unit 21, processor 22, network interface 23, data store 24, memory 25, local interface 26, and one or more input/output interfaces 30, may be housed, contained, or positioned on the body 11 and/or the firearm attachment structure 12.

In preferred embodiments, a firearm attachment structure 12 may comprise a first rail receiver 12A and a second rail receiver 12B which may be configured to temporarily mount to a rail 205, such as a Picatinny rail mount, Weaver rail mount, or other tactical rail mount common in the art of a firearm 200. The firearm attachment structure 12 may also comprise a frame channel 20 which may be shaped to receive portions of the frame 203 of a firearm 200 that are in front of the trigger guard 202 and below the muzzle 204 of the barrel 201. Preferably, the rail receivers 12A, 12B, may be disposed in the frame channel 20 so that the rail receivers 12A, 12B, generally oppose each other in order to engage opposing portions of a rail 205 of the firearm 200. In other embodiments, a firearm attachment structure 12 may comprise a tongue and groove type fastener, a clip type fastener, a clasp type fastener, a ratchet type fastener, a threaded type fastener such as screws and bolts, a buckle type fastener and the like, or any other suitable joining method capable of temporarily attaching portions of a firearm attachment structure 12 to a firearm 200. In other embodiments, a firearm attachment structure 12 may enable the apparatus 101 to be removably coupled to, molded into, integrally formed with, or otherwise coupled to an element, such as a butt stock, handgrip, and frame 203, of the firearm 200.

Figure 7:
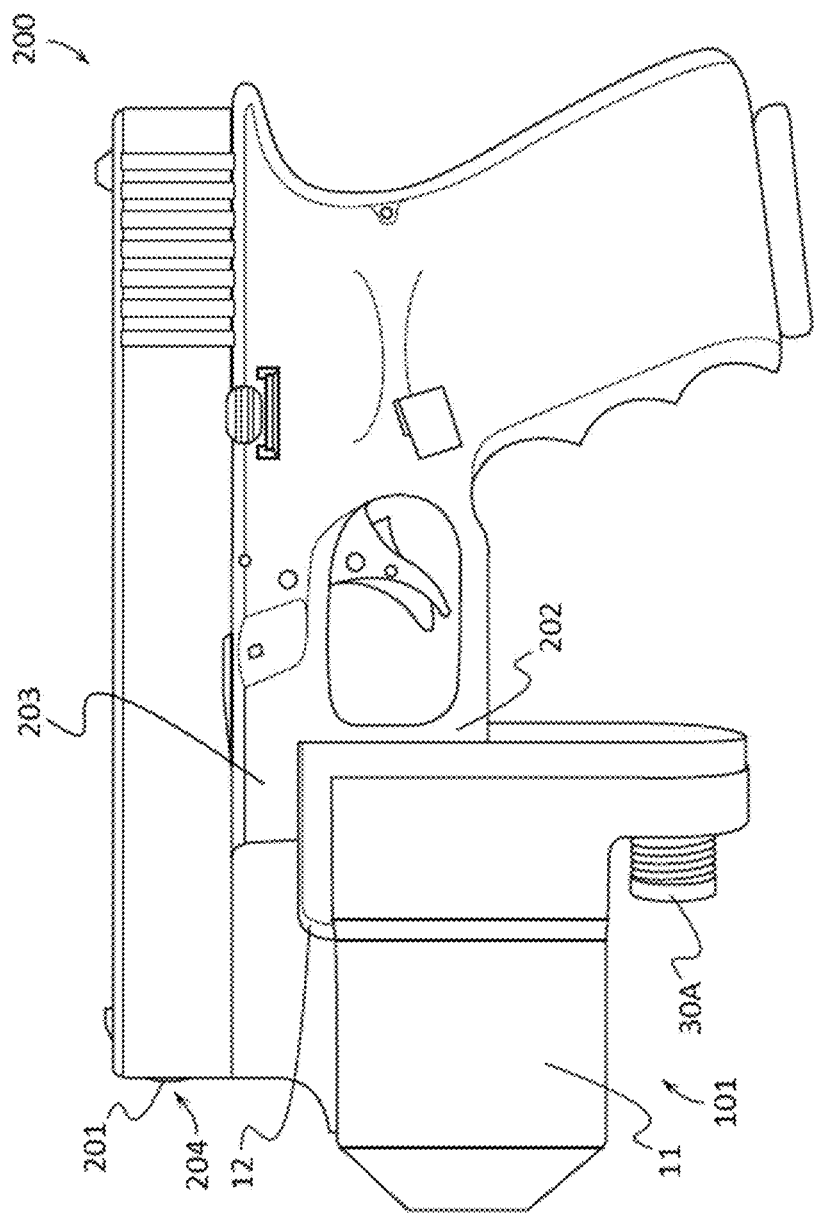
FIG. 7 depicts a side elevation view of an example of a firearm environmental recording apparatus attached to a firearm according to various embodiments described herein.

As perhaps best shown by FIG. 7, in preferred embodiments, the apparatus 101 may be attached to a firearm 200 below the barrel 201 and in front of the trigger guard 202 and preferably with a camera 30A oriented in generally the same direction as the barrel of the firearm 201. In other embodiments, the apparatus 101 may be attached to the firearm 200 above the barrel 201. In further embodiments, the apparatus 101 may be attached to the firearm 200 on one or more sides of the barrel 201. In still further embodiments, the apparatus 101 may be attached to the firearm 200 on the receiver, stock, magazine, or any other location on a firearm 200.

Figure 8:
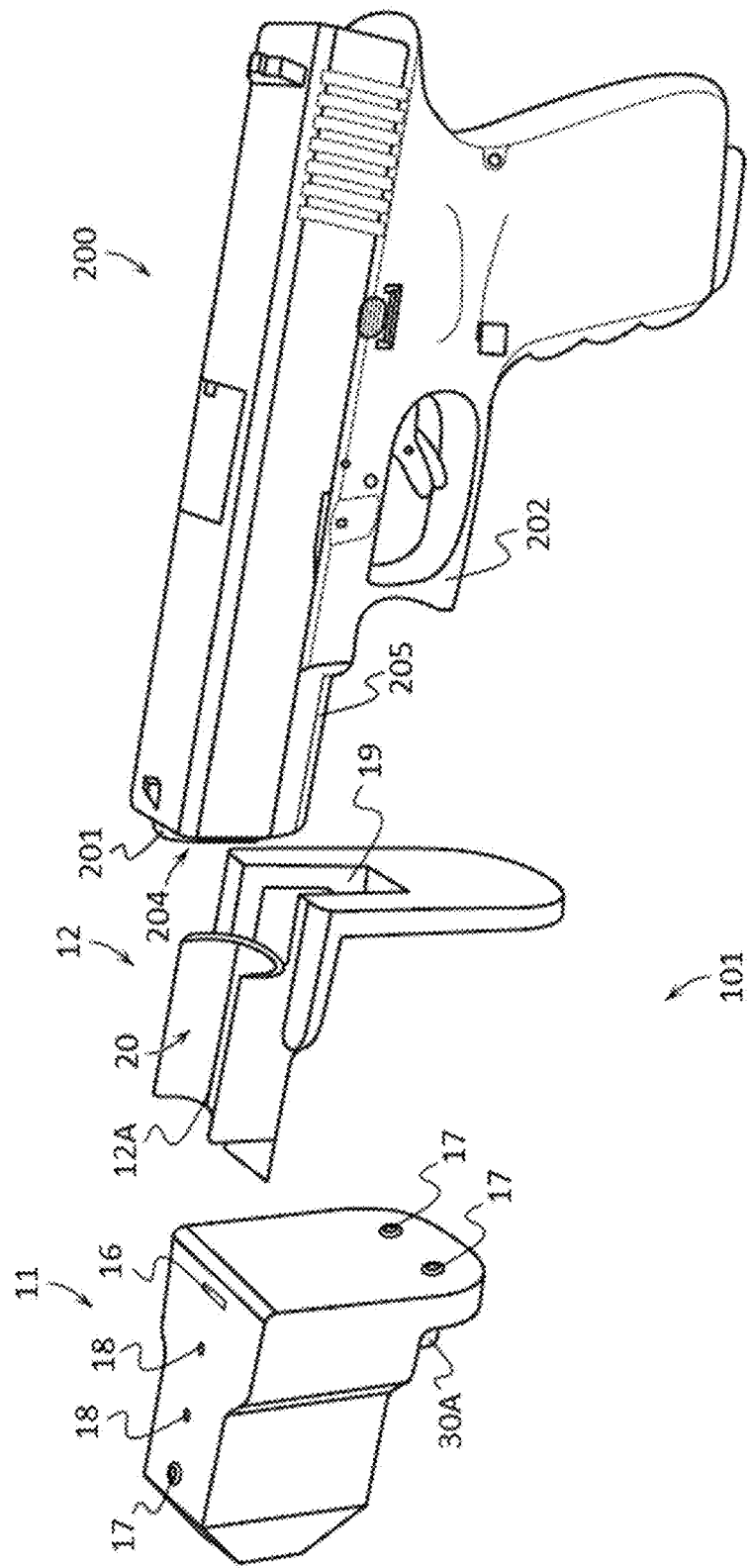
FIG. 8 illustrates a perspective exploded view of an example of a firearm environmental recording apparatus and a firearm according to various embodiments described herein.

FIG. 8 illustrates a perspective exploded view of an example of a firearm environmental recording apparatus 101 and a firearm 200 according to various embodiments described herein. In some embodiments, the body 11 and the firearm attachment structure 12 may be removably coupled together. The body 11 may comprise one or more connection points 17 which may align and/or secure the body 11 to the firearm attachment structure 12. For example, the connection points 17 may be configured as locking protrusions which may be received and secured within complementary shaped locking depressions on the firearm attachment structure 12. Once a connection point 17 is received within a complementary shaped locking depression the body 11 may be secured to the firearm attachment structure 12. In further embodiments, the body 11 may be removably coupled to the firearm attachment structure 12 with one or more fasteners, such as one or more set screws, which may be received by one or more fastener apertures 18.

In some embodiments, the firearm attachment structure 12 may be configured to mate with a specific firearm 200. In further embodiments, the firearm attachment structure 12 may comprise a trigger guard channel 19 which may be configured with a shape that allows a portion of the trigger guard 202 of a firearm 200 to be received in the trigger guard channel 19. In still further preferred embodiments, portions of the firearm attachment structure 12, such as the trigger guard channel 19 and rail receivers 12A, may be shaped and positioned to allow the firearm attachment structure 12 to mate with a specific firearm 200. For example, a user may have three different shaped firearms 200. A single body 11 may be removably coupled to three different firearm attachment structures 12, each configured to be secured to one specific firearm 200, to allow the user to secure the one body 11 to the three different firearms 200 without having to have a body that is only securable to one type of firearm 200. In alternative embodiments, the body 11 may be coupled to the firearm attachment structure 12 with adhesive, by being integrally formed or molded together, or by any other suitable coupling method.

It should be understood that while a firearm 200 is depicted in FIGS. 1, 7, 8, and 12 as being a pistol or handgun, an apparatus 101 may be coupled to and/or integrally formed with any component of a firearm 200, and that a firearm 200 may include any type of lethal or non-lethal weapon including but not limited to a rifle, shotgun, machine pistol, machine gun, stun gun, grenade gun, flare gun, recoilless gun, gas firing non-lethal weapon, chemical firing non-lethal weapon, and non-lethal projectile weapon.

The body 11, a firearm attachment structure 12, and any other elements that may comprise the apparatus 101 may be made from durable materials such as hard plastics, ABS plastics, metals and metal alloys including high grade aircraft alloys, wood, hard rubbers, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials.

Figure 9:
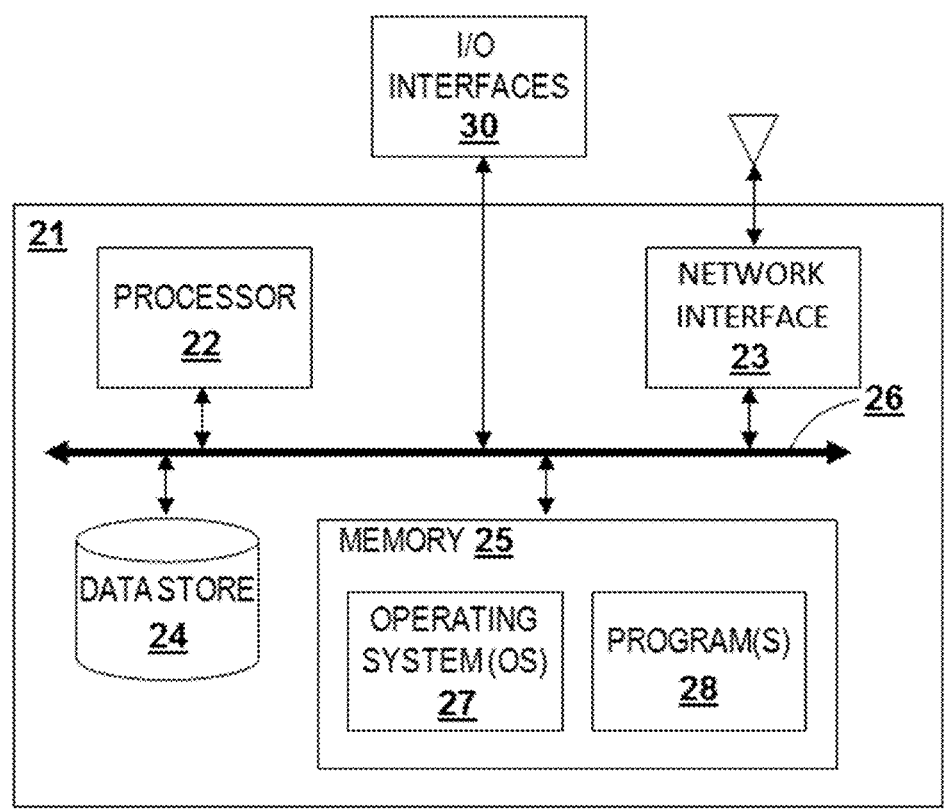
FIG. 9 shows a block diagram showing some of the elements of an example of a firearm environmental recording apparatus according to various embodiments described herein.

FIG. 9 depicts a block diagram showing some of the elements of an example processing unit 21 which the apparatus 101 may comprise according to various embodiments described herein. In some embodiments and in the present example, the apparatus 101 can be a digital device that, in terms of hardware architecture, comprises a processing unit 21 which may generally include a processor 22, an optional network interface 23, a data store 24, and memory 25. It should be appreciated by those of ordinary skill in the art that FIG. 9 depicts the apparatus 101 in an oversimplified manner, and a practical embodiment may include additional components or elements and suitably configured processing logic to support known or conventional operating features that are not described in detail herein. The components and elements (22, 23, 24, and 25) are communicatively coupled via local interface 26 to one or more input/output interfaces 30. The local interface 26 can be, for example but not limited to, one or more buses or other wired or wireless connections, as is known in the art. The local interface 26 can have additional elements, which are omitted for simplicity, such as controllers, buffers (caches), drivers, repeaters, and receivers, among many others, to enable communications. Further, the local interface 26 may include address, control, and/or data connections to enable appropriate communications among the aforementioned components.

The processor 22 is a hardware device for executing software instructions. The processor 22 can be any custom made or commercially available processor, a central processing unit (CPU), an auxiliary processor among several processors associated with the processing unit 21, a semiconductor-based microprocessor (in the form of a microchip or chip set), or generally any device for executing software instructions. When the processing unit 21 is in operation, the processor 22 is configured to execute software stored within the memory 25, to communicate data to and from the memory 25, and to generally control operations of the apparatus 101 pursuant to the software instructions. In an exemplary embodiment, the processor 22 may include a mobile optimized processor such as optimized for power consumption and mobile applications. In some embodiments, a processor 22 may comprise a System on a Chip (SoC) and be formed by an integrated circuit (IC) that integrates all components of a computer or other electronic system into a single chip. It may contain digital, analog, mixed-signal, and often radio-frequency functions on a single chip substrate. In further embodiments, a processing unit 21 may comprise a system in package (SiP) which may be formed by or comprise a number of SoC chips in a single package.

The I/O interfaces 30 can be used to receive and record environmental information and to receive user input. The I/O interfaces 30 can also include, for example, a serial port, a parallel port, a small computer system interface (SCSI), an infrared (IR) interface, a radio frequency (RF) interface, a universal serial bus (USB) interface, and the like.

An optional network interface 23 enables wired and/or wireless communication to an external access device or network 105. In preferred embodiments, a network interface 23 may comprise a radio. Any number or type of wireless data communication protocols, techniques, or methodologies can be supported by a network interface 23, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. In some embodiments, a network interface 23 may operate on a cellular band and may communicate with or receive a Subscriber Identity Module (SIM) card or other wireless network identifier. In further embodiments, a network interface 23 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 23 may include address, control, and/or data connections to enable appropriate communications on the network.

In further embodiments, the apparatus 101 may not comprise a network interface 23 and may not have the ability to communicate or be communicated with. In alternative embodiments, the apparatus 101 may comprise a network interface 23 which offers blue tooth and/or Wifi communication to be communicated with or to communicate via secure networks home or mobile device which may send a text or email message to owner through home internet and/or Wifi network. In alternative embodiments, the apparatus 101 may comprise a network interface 23 which may offer any number of suitable wireless data communication protocols, techniques, or methodologies to allow real time satellite and airborne support for visual and physical rescue. In further alternative embodiments, the apparatus 101 may comprise a network interface 23 which may enable the apparatus 101 to securely communicate with one or more other apparatuses 101 directly and/or via a network 105.

In some embodiments, a network interface 23 may be used to communicate data such as to upload new firmware directly to the apparatus 101 and software updates to improve user experience. In some embodiments, a network interface 23 may be used to communicate data to Heads-Up Display such as to a client device 400. In further embodiments, a network interface 23 may be used to provide communication with the apparatus 101 or user through password verification, to call emergency services, to call for back up when shots are fired, to inform of local/state firearm laws, such as when going from one state to the other it may retrieve data to inform you if any laws for your firearm applies, gun free zones etc. In some embodiments, a network interface 23 may be used to detect a RFID wireless key to detect if a firearm 200 attached to the apparatus 101 is holstered or inside any sort of storage device.

The data store 24 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 24 may incorporate electronic, magnetic, optical, and/or other types of storage media.

The memory 25 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 25 may incorporate electronic, magnetic, optical, and/or other types of storage media. Note that the memory 25 may have a distributed architecture, where various components are situated remotely from one another, but can be accessed by the processor 22. The software in memory 25 can include one or more software programs 28, each of which includes an ordered listing of executable instructions for implementing logical functions. In the example of FIG. 9, the software in the memory system 25 includes a suitable operating system (O/S) 27 and programs 28.

The operating system 27 essentially controls the execution of input/output interface 30 functions, and provides scheduling, input-output control, file and data management, memory management, and communication control and related services. The operating system 27 may be, for example, LINUX (or another UNIX variant), Android (available from Google), Symbian OS, Microsoft Windows CE, Microsoft Windows 7 Mobile, Microsoft Windows 10 Mobile, iOS (available from Apple, Inc.), webOS (available from Hewlett Packard), Blackberry OS (Available from Research in Motion), and the like. The programs 28 may include various applications, add-ons, etc. configured to provide end user functionality with the apparatus 101. For example, exemplary programs 28 may include, but not limited to, environmental variable analytics and modulation of input/output interface 30 functions. In a typical example, the end user typically uses one or more of the programs 28 to record environmental variables and to modulate light emitted by a laser light emitting element 30D and/or a LED light emitting element 30E. In another example, exemplary programs 28 may include, but not limited to, a real time clock or timer program which may be configured to track input from an I/O interface 30 and to correlate the input with a time stamp or time period.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The processing unit 21 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 22. In addition, the main memory may be used for storing temporary variables or other intermediate information during the execution of instructions by the processor 22. The processing unit 21 may further include a read only memory (ROM) or other static storage device (e.g., programmable ROM (PROM), erasable PROM (EPROM), and electrically erasable PROM (EEPROM)) coupled to the bus for storing static information and instructions for the processor 22.

Figure 10:
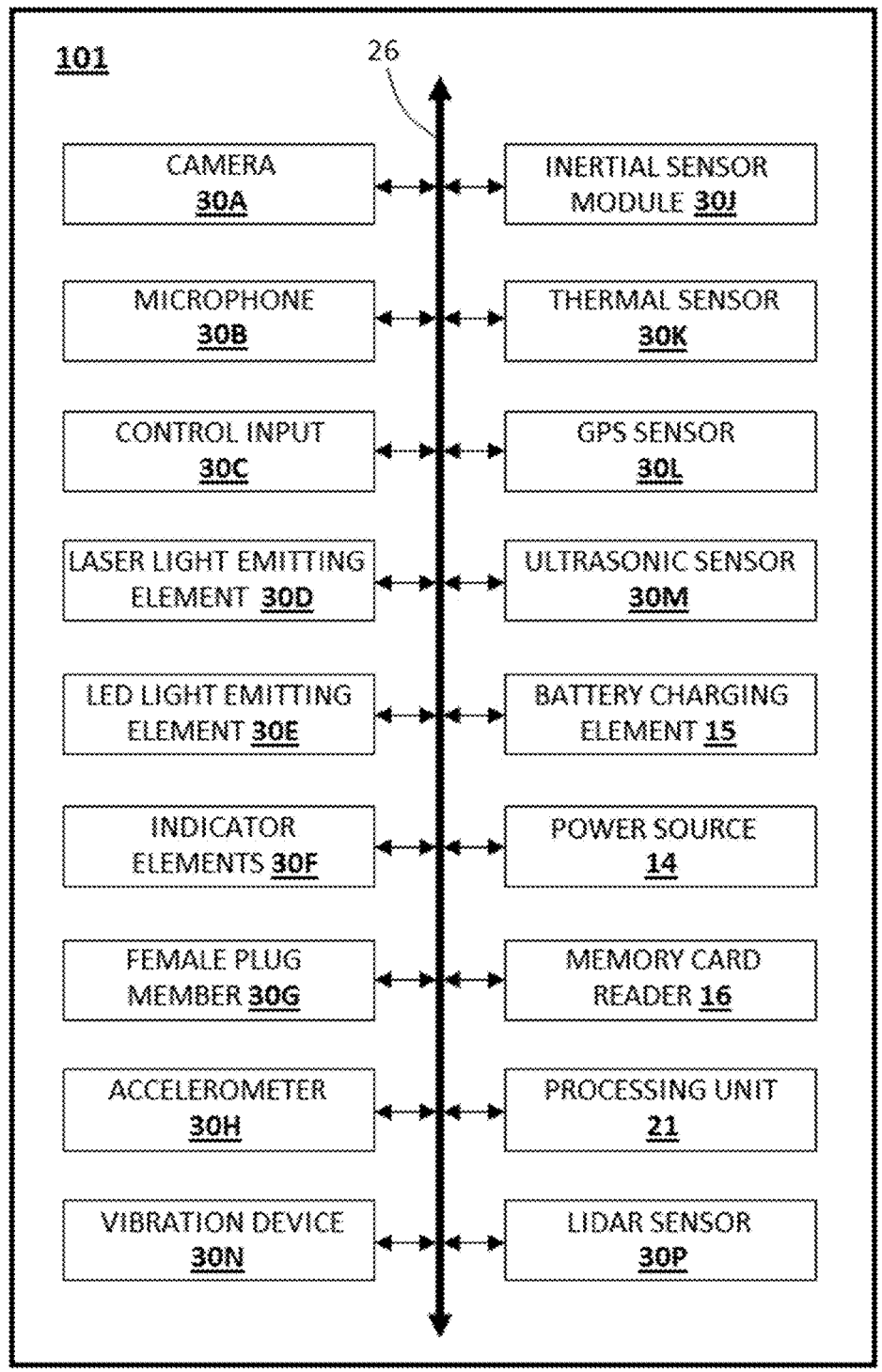
FIG. 10 depicts a block diagram showing some of the input/output interfaces of an example of a firearm environmental recording apparatus according to various embodiments described herein.

FIG. 10 illustrates a block diagram showing some of the optional input/output interfaces 30 of an example of a firearm environmental recording apparatus 101 according to various embodiments described herein. In some embodiments, the apparatus 101 may comprise one or more input/output interface elements 30 positioned anywhere on the body 11 and/or firearm attachment structure 12 of the apparatus 101. In preferred embodiments, an input/output interface elements 30 may include one or more cameras 30A, microphones 30B, control inputs 30C, laser light emitting elements 30D, light emitting diode (LED) light emitting elements 30E, indicator elements 30F, and/or inertial sensor module 30J. In further embodiments, an input/output interface element 30 may comprise a female plug member 30G, accelerometer 30H, thermal sensor 30K, GPS sensor 30L, ultrasonic sensor 30M, vibration device 30N, and/or LIDAR sensor 30P.

The input/output interfaces 30 may be positioned anywhere on or within the apparatus 101 and may be communicatively coupled to a processing unit 21 via a local interface 26. Additionally, one or more optional memory card readers 16, optional power source 14, and/or optional power source charging elements 15 may also be coupled to a processing unit 21 and the input/output interfaces via a local interface 26.

A camera 30A may be configured to record still images or video images of the environment around the apparatus 101 and preferably of the environment generally located in front of the barrel 201 of a firearm 200. In preferred embodiments, a camera 30A may comprise a digital camera that encodes images and videos digitally on a charge-coupled device (CCD) image sensor or on a complementary metal-oxide-semiconductor (CMOS) image sensor and stores them for later reproduction. In other embodiments, a camera 30A may comprise any type of camera which includes an optical system, typically using a lens with a variable diaphragm to focus light onto an image pickup device or image sensor. In further preferred embodiments, a camera 30A may comprise a camera with night vision technology such as image intensification, active illumination, and/or thermal imaging capabilities. In yet further embodiments, the camera 30A may be configured to work with firmware or software within the apparatus 101, or connected to the apparatus 101 (e.g. through a data network or NFC) to process facial recognition imagining protocols common in the field of image recognition technology.

In some embodiments, a camera 30A may be configured to record night vision, infrared, and/or visible light still images or video images of the environment around the apparatus 101. 3D recreations of action scene using video and ultra sonic data to recreate firearm actions and physical environment involved. In further embodiments, data recorded by a camera 30A may be used to recreate event in virtual reality for crime scene investigators to study, provide facial recognition and color recognition, provide target tracking, provide Night Vision/Thermal for stealth mode, provide Live Training/Tactical Support from tech/military veteran call centers, provide Virtual Gun Safety Course, provide Virtual Target Practice, provide Special Support Operations, and/or to detect at what level threat the opponent is to you.

A microphone 30B may be configured to pick up or record audio data from the environment around the apparatus 101 and preferably from the environment generally located around a firearm 200. In preferred embodiments, a microphone 30B may comprise any acoustic-to-electric transducer or sensor that converts sound in air into an electrical signal. In further embodiments, a microphone 30B may comprise any type of microphone such as electromagnetic induction microphones (dynamic microphones), capacitance change microphones (condenser microphones), and piezoelectricity microphones (piezoelectric microphones) to produce an electrical signal from air pressure variations.

In some embodiments, the apparatus 101 may comprise a control input 30C which may be configured to modulate the functions of any of the input/output interfaces 30 and/or to control power to the apparatus 101 as a whole. In some embodiments, an optional control input 30C may comprise a button or a switch. In other embodiments, an optional control input 30C may comprise one or more user control inputs such as turnable control knobs, depressible button type switches, slide type switches, rocker type switches, or any other suitable input that may be used to modulate the functions of any of the input/output interfaces and/or to control power to the apparatus 101.

A light emitting input/output interface such as a laser light emitting element 30D and a LED light emitting element 30E may be configured to illuminate areas in the environment with various forms and wavelengths of light. Preferably, a light emitting input/output interface may also comprise an adjustment mechanism such as screw type windage and elevation adjustments which may facilitate the alignment of the light emitted relative to the barrel 201 of a firearm 200. In some embodiments, a light emitting element 30D, 30E, may be activated by data provided by a microphone 30B, control input 30C, thermal sensor 30K, ultrasonic sensor 30M, and/or any other input/output interfaces 30.

An indicator element 30F may be configured to apprise a user of the apparatus 101 of the status of one or more input/output interfaces and/or the status of the apparatus 101 such as if they are powered on and the like. For example, an indicator element 30F may comprise a display device such as a Liquid Crystal Display (LCD), a Cathode ray tube (CRT) display, a Field emission display (FED), a Vacuum fluorescent display (VFD), a Surface-conduction electron-emitter display (SED), a thin or thick film electro-luminescence (EL) display, an inorganic or organic light emitting diode (LED, OLED) display, a Plasma display panel (PDP), a gas discharge display (Nixie tube), or any other suitable display for outputting visual information such as current data on fire arm, data points, gunshot verification, recording status, acceleration data, gunshot counter. In other preferred embodiments, an indicator element 30F may be configured to apprise a user of the apparatus 101 of the status or charge level of a power source 14 or power source charging element 15. To provide for information to a user, embodiments of an indicator element 30F can be visually implemented with one or more light emitting elements or other display device, e.g., a LED (light emitting diode) display or LCD (liquid crystal display) monitor, for displaying information. Other kinds of indicator element 30F devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In some embodiments, an indicator element 30F may comprise a speaker which may be used to produce a plurality of sounds at a plurality of volume levels. In other embodiments, an indicator element 30F may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds. In further embodiments, a speaker-type indicator element 30F may be used with a microphone 30B to allow a user to interact with the apparatus 101 by issuing and receiving voice commands. For example, voice command control center/speak to (JARVIS) Just a Rather Very Intelligent System, to provide control customized settings ask for location statistics/danger levels based on historic events current populations, respond to voiced questions, such as "How safe am I?" "Please send back up", Firearm Alarm Control/Settings to deter unauthorized personal from using the firearm in any form of comfort, as an alarm, as LRAD (Long Range Acoustics Hailing Device) used in crowd control, and/or for High Frequency Non Lethal Sound Wave Projection.

A female plug member 30G may be configured to provide electrical power to a power source 14 and/or the female plug member 30G may be configured to provide electrical communication with the data store 24, memory 25, processor 22, network interface 23, or any other element of the apparatus 101. A female plug member 30G may also be configured to edit, change, or otherwise update the operating system (O/S) 27 and/or the programs 28 on the apparatus 101. In preferred embodiments, a female plug member 30G may comprise a USB connector such as a micro-USB or mini-USB. In other embodiments, a female plug member 30G may comprise a Type A USB plug, a Type B USB plug, a Mini-A USB plug, a Mini-B USB plug, a Micro-A USB plug, a Micro-B USB plug, a Micro-B USB 3.0 plug, a ExtMicro USB plug, a Lightning plug, a 30-pin dock connector, a Pop-Port connector, a Thunderbolt plug, a Firewire plug, a Portable Digital Media Interface (PDMI) plug, a coaxial power connector plug, a barrel connector plug, a concentric barrel connector plug, a tip connector plug, or any other plug, connector, or receptacle capable of electrical communication with an electronic device.

An accelerometer 30H may be configured to measure and provide acceleration data about the apparatus 101 to a processing unit 21. An accelerometer 30H may comprise any type of accelerometer including capacitive accelerometers, piezoelectric accelerometers, piezoresistive accelerometers, hall effect accelerometers, magnetoresistive accelerometers, heat transfer accelerometers, micro-electro mechanical system (MEMS) accelerometers, NANO technology accelerometers, or any other suitable device that is able to measure acceleration and to electrically communicate acceleration data.

In some embodiments, the apparatus 101 may comprise an inertial sensor module 30J which may provide orientation data which may include 11 axes of data, such as 3 axes of accelerometer data, 3 axes gyroscopic, 3 axes magnetic (compass), barometric pressure/altitude and temperature. The 11 axes of data may provide exact spatial measurements, acceleration, velocity, of the apparatus 101 to tell at all times what position and where in space the firearm 200 with an attached apparatus 101 is, e.g. is it laying on its side, has it been drawn, dropped, thrown in the air, moving in a car, walking/running etc. Data provided by an inertial sensor module 30J may be used to generate a live 3D model of the firearm 200 and how it is actually being handled in space, for example, how the firearm 200 moved as it was thrown in the air and how it is positioned after it lands. The inertial sensor module 30J also works in conjunction with other input/output interfaces 30 to determine when firearm has been fired, multiply redundancy to ensure it never misses a fire. In preferred embodiments, an inertial sensor module 30J may comprise a ten degrees of freedom inertial sensor module, such as the ADIS16488 Tactical Grade Ten Degrees of Freedom Inertial Sensor produced by Analog Devices and available through Mouser Electronics, or the like.

In some embodiments, a gyroscope may included on a ten degrees of freedom type inertial sensor module 30J. A gyroscope may be configured to measure and communicate position data, orientation data, position change data, and/or orientation change data about the apparatus 101 to a processing unit 21. In preferred embodiments, a gyroscope may comprise a micro electro-mechanical system (MEMS) gyroscope. In other embodiments, a gyroscope may comprise a fiber optic gyroscope (FOG) gyroscope, a hemispherical resonator gyroscope (HRG), a vibrating structure gyroscope (VSG) or a Coriolis Vibratory Gyroscope (CVG), a dynamically tuned gyroscope (DTG), a ring laser gyroscope (RLG), a London moment gyroscope, a tilt sensor such as a MEMS tilt sensor, any other type of tilt sensor, or any other suitable device that is able to measure and electrically communicate tilt data, positional data, and/or orientation data.

In further embodiments, data provided by an inertial sensor module 30J may be used to determine if a child is carrying firearm versus an adult, send text message to owner when the apparatus 101 is moved after sitting for a period of time, such settings may be personal preference, and may include a screen lock and/or sleep mode setting for an electronic device 400, how long do you want it to stay awake in an inactive mode before it puts its self in sleep mode. In further embodiments, data provided by an inertial sensor module 30J may be used to determine if owner is carrying or operating a firearm 200 to which the apparatus 101 is attached versus someone who has no permission.

In further embodiments, data provided by an inertial sensor module 30J may be used to function as Firearm Performance Dyno for the enthusiast that custom modifies firearms 200, such as slides for less recoil or other performance enhancements. Data provided by an inertial sensor module 30J may be used to be able to determine the effectiveness of any dynamic modifications, including personal-loaded bullets, if the user shoots a firearm 200 more accurately with a lower grain bullet, much more recoil is produced after a modification, what changes and affects, and other like Firearm Performance Dyno information.

In further embodiments, data provided by an inertial sensor module 30J may be used to help improve shooter experience, did the user squeeze the trigger, jerk it, after discharge, where is the weakness in the user's form, and the like. Data provided by an inertial sensor module 30J may be used to show a rookie what they are doing wrong in real time while operating the firearm to improve operation efficiency in draw time using geometric spatial algorithms to help the user get the firearm 200 from the holster position to the firing position as fast and safe as possible.

In further embodiments, data provided by an inertial sensor module 30J may be used to process Dynamic Communication Commands from user to the apparatus 101. In further embodiments, data provided by an inertial sensor module 30J may be used to determine when round has been chambered in a firearm 200 to which the apparatus 101 is attached.

A thermal sensor 30K may be configured to measure and communicate temperature data of temperature change data about the environment around an apparatus 101 to a processing unit 21. In preferred embodiments, a thermal sensor 30K may comprise a thermal imaging sensor. In other embodiments, a thermal sensor 30K may comprise a thermocouple sensor, resistive temperature device (RTDs, thermistors) sensor, infrared radiator sensor, bimetallic device sensor, liquid expansion device sensor, molecular change-of-state and silicon diode sensor, or any other suitable device that is able to measure and electrically communicate thermal imaging data and/or temperature data.

In some embodiments, data provided by a thermal sensor 30K may be used to detect heat discharge from gunfire for added detection and redundancy for gunshot count and event recorder. In some embodiments, data provided by a thermal sensor 30K may be used to detect warm living organic bodies in close proximity, such as if a firearm 200 attached to the apparatus 101 is being pointed at living body, a camera 30A may automatically activate. In some embodiments, data provided by a thermal sensor 30K may be used to determine if a firearm 200 is pointing at a human even if it's not being directed in a purposeful manner. For example, if you point the apparatus 101 at a living organism it will active camera 30A based on the fact that it is being pointed at something with a heat signature of life. In further embodiments, a sensor, such as a thermal sensor 30K and/or any other input/output interface(s) 30 may be used by the processing unit 21 to determine when data and video footage recorded by the apparatus 101 involves a violent action taken against another human. This data may be automatically recognized by the apparatus 101 and instantly encrypted, becoming un-accessible to all parties except to the manufacturer of the apparatus 101. This data may be provided to the owner of the apparatus 101 only through specific legal request, preventing any random party from submitting the data to the public for graphic illegal actions. In further embodiments, a sensor, such as a thermal sensor 30K and/or any other input/output interface(s) 30, may be used by the processing unit 21 to determine when data and video footage recorded by the apparatus 101 involves a violent action taken against another human. The apparatus 101 may not record or retain data unless a qualifying 'event', such as a violent action taken against another human occurs. The apparatus 101 may be always collecting, filtering, and temporarily storing it's data, but only when specific event characteristics which are indicative of a violent action taken against another human are measured by input/output interface(s) 30 does the apparatus 101 start recording or 'hard saving' its data. When these 'event' characteristics are detected the software may be designed to save all data within a specific timeframe before and after said trigger 'event', and then encrypt that data. Custom event characteristics can be set by the user but certain actions, such as when the apparatus 101 is in the firing position, pointed at a living body, or when the firearm 200 is discharged will always qualify as an 'event'. If throughout the day the apparatus 101 does not record any data that meets the characteristics necessary to be considered an 'event' the apparatus 101 may have no data stored or collected for that date.

A GPS sensor 30L may be configured to receive a global positioning system (GPS) signal and calculate coordinate data for an apparatus 101 and to communicate the data to a processing unit 21. In preferred embodiments, a GPS sensor 30L may comprise GPS logger sensor which may log the position of the apparatus 101 at regular intervals in a memory. In other embodiments, a GPS sensor 30L may comprise a GPS data pusher sensor configured to push or send the position of the apparatus 101 as well as other information like speed or altitude at regular intervals. In further embodiments, a GPS sensor 30L may comprise a GPS data puller sensor or GPS transponder sensor which may be queried for GPS data as often as required. In still further embodiments, a GPS sensor 30L may comprise any other suitable device or sensor that is able to measure and electrically communicate GPS data.

In some embodiments, data provided by a GPS sensor 30L may be used to upload positional data to secure server, track warriors in the field, give heads up display and location of all friendly combatants, such as for a military or group attack force application to assist in preventing fatal friendly fire, and/or to keep track of supported combatants and advise them with tactical strategy such as when governments give weapons to rebel fighters in foreign nations.

An ultrasonic sensor 30M may be configured to actively generate high frequency sound waves and evaluate the echo which is received back by the sensor, measuring the time interval between sending the signal and receiving the echo to determine the distance to an object, or an ultrasonic sensor 30M may be configured to passively detect ultrasonic noise that is present in the environment around an apparatus 101 and to communicate the data to a processing unit 21. In preferred embodiments, an ultrasonic sensor 30M may comprise an ultrasonic proximity sensor, and ultrasonic two point proximity switch, an ultrasonic retro-reflective sensor, and/or an ultrasonic through beam sensor. In other embodiments, an ultrasonic sensor 30M may comprise any other suitable device or sensor that is able to measure and electrically communicate ultrasonic data.

One or more vibration devices 30N may be vibrationally coupled to the body 11 of the apparatus 101. A vibration device 30N may be configured to vibrate, shake, or produce any other series of rapid and repeated movements. In some embodiments, a vibration device 30N may be vibrationally coupled to the body 11 by being directly coupled to a portion of the body 11 so that vibrations from the vibration device 30N may be transferred from the vibration device 30N through the body 11 thereby vibrating or otherwise agitating the apparatus 101. A vibration device 30N may comprise a long life brushless (BLDC) vibration motor, a coin or pancake vibration motor, an encapsulated vibration motor, an enclosed vibration motor, a pager motor, an eccentric rotating mass (ERM) motor, a linear resonant actuator (LRA), a printed circuit board (PCB) mounted vibration motor, or any other electrical device capable of producing a series of rapid and repeated movements.

In some embodiments, the apparatus 101 may include a Laser Imaging Radar (LIDAR) sensor 30N which may comprise a remote sensing technology that measures distance by illuminating a target with a laser and analyzing the reflected light. This distance data may be communicated to the processing unit 21 such as for generating images of objects proximate to the apparatus 101. A LIDAR sensor 30N may use ultraviolet, visible, or near infrared light to image objects and a wide range of materials, including non-metallic objects, rocks, rain, chemical compounds, aerosols, clouds and even single molecules. Wavelengths used by a LIDAR sensor 30N may vary to suit the target: from about 10 micrometers to the UV (approximately 250 nm). Light may be reflected via backscattering. Different types of scattering may be used for different LIDAR applications: most commonly Rayleigh scattering, Mie scattering, Raman scattering, and fluorescence. In further embodiments, a LIDAR sensor 30N may use a LIDAR detection schemes such as "incoherent" or direct energy detection (which is principally an amplitude measurement) and coherent detection (which is best for Doppler, or phase sensitive measurements). Coherent systems generally use Optical heterodyne detection, which, being more sensitive than direct detection, allows them to operate at a much lower power but at the expense of more complex transceiver requirements. In still further embodiments, a LIDAR sensor 30N may use any other type of LIDAR technology.

In some embodiments, data from a vibration device 30N, microphone 30B, and/or inertial sensor module 30J may be used to detect a gunshot by a firearm 200. If a gunshot is detected and data recording by an input/output interface 30 has not started it will begin automatically. In some embodiments, data from a vibration device 30N, microphone 30B, and/or inertial sensor module 30J may be used to detect a single gunshot and keep count of a semi-automatic. This is not limited to the firearm itself but the area, for example if you are fired upon first, it will activate upon the attack of another shot fired within range.

In some embodiments, data from a vibration device 30N, microphone 30B, and/or inertial sensor module 30J may be used to detect if fully automatic is firing and/or detect individual gunfire used in bullet counting feature. In some embodiments, data from a vibration device 30N, microphone 30B, and/or inertial sensor module 30J may be used to communicate with user how many rounds in the magazine, for example if you have a jam in the field, after clearing the round, it will give you the information about the status of the what's live in the magazine, this would be specific information that the user may communicate or that may be programmed to the apparatus 101 in advance of operation i.e. caliber/size of magazine used.

In some embodiments, data from a vibration device 30N, microphone 30B, and/or inertial sensor module 30J may be used to give shooter in advance warning low rounds in magazine so that you never end up clicking at the enemy. In some embodiments, data from a vibration device 30N, microphone 30B, and/or inertial sensor module 30J may be used to provide shot Spotter functions such as, if firearm 200 is discharged in local area the apparatus 101 may give you approximation at what distance the shot was fired from apparatus 101 location.

In some embodiments, data from an ultrasonic sensor 30M may be used for measuring wind speed and direction (anemometer). For measuring speed or direction, calculates the speed from the relative distances to particulates in the air and detect approaching objects and track their positions. Software can be written to help snipers for long range shots or short range as well, as mentioned above about heads up display on a fighter jet, this would allow you to point at the object on the screen while the computer does all the calculations of distance and wind speed so that your round meets the designated target with very little hesitation or calculations. Put the dot in the box and fire.

In some embodiments, data provided by a LIDAR sensor 30P may optionally be combined with data from a camera 30A, microphone 30B, GPS sensor 30L, and/or any data from any other input/output interfaces 30 to know everything that is happening within a given range of the input/output interfaces 30, to provide a more refined detection with OLED screen feed back or using such as Google glass or some type of glasses style viewer, to track flight path of bullet to target, and/or to pin point opponents in a fire fight, for example, if you are pinned down and a sniper is out in the field, or close range attackers, this tech will show you exactly where the shooter is located in such give you the best chance of finding the enemy position before they find yours.

In some embodiments, apparatus 101 may comprise one or more rechargeable and/or replaceable power sources 14 which may provide electrical power to an element that may require electrical power and to any other electronic device or electronics that may be in electrical communication with a processing unit 21. A power source 14 may comprise a lithium ion battery, nickel cadmium battery, alkaline battery, or any other suitable type of battery. In other preferred embodiments, the body 11 may be used to secure a rechargeable or non-rechargeable power source 14 which may or may not be removable from the body 11. In further embodiments, apparatus 101 may comprise a power source charging element 15 such as a kinetic or motion charging, or by inductive charging or other wireless power supply. In some embodiments, the apparatus 101 may comprise a piezo kinetic or motion power source charging element 15 which may be used as extra sensor to cross check and verify in detection and/or for energy production for charging a power source 14 through motion and forces. In further embodiments, a piezo kinetic or motion power source charging element 15 may be used to collect recoil energy from the firearm 200 every time the firearm 200 is shot. In further embodiments, a power source charging element 15 may comprise a solar or photovoltaic cell which may be used to charge the power source 14 and/or to provide power to a real time clock.

A memory card reader 16 may be configured to receive data from a processing unit 21 or any other element of an apparatus 101 and to electrically communicate the data to a removable storage device such as a memory card. In some embodiments, the memory card reader 16 may be positioned on the body 11 so that when the apparatus 101 is secured to the firearm 200 as shown in FIG. 7, the memory card reader 16 may not be accessible, such as by being covered by the firearm attachment structure 12, to prevent unauthorized removal of a memory card reader 16 from the memory card reader 16. In preferred embodiments, a memory card reader 16 may comprise a microSD memory card reader that is configured to receive a microSD memory card and to read and write data to the microSD memory card. In other embodiments, a memory card reader 16 may comprise a memory card reader that is configured to receive and to read and write data to a memory card such as a PC Card memory card, CompactFlash I memory card, CompactFlash II memory card, SmartMedia memory card, Memory Stick memory card, Memory Stick Duo memory card, Memory Stick PRO Duo memory card, Memory Stick PRO-HG Duo memory card, Memory Stick Micro M2 memory card, Miniature Card memory card, Multimedia Card memory card, Reduced Size Multimedia Card memory card, MMC-micro Card memory card, P2 card memory card, Secure Digital card memory card, SxS memory card, Universal Flash Storage memory card, mini SD card memory card, xD-Picture Card memory card, Intelligent Stick memory card, Serial Flash Module memory card, μ card memory card, NT Card memory card, XQD card memory card, or any other removable memory storage device including USB flash drives.

In some embodiments, the microphone 30B may be configured to constantly record audio data and store the data in a loop fashion so that the information from a predetermined time period is constantly stored while information that is outside the predetermined time period may be deleted. For example, the microphone 30B may be configured to record all audio information which may be stored a data store 24, while the processor 22 may be configured to delete any audio information that is older than a selected time period such as two minutes, five minutes, fifteen minutes, or any other user selected time period. Once the microphone 30B records audio information over a certain decibel limit such as those common to firearm discharges, the processor 22 may be configured to cease the deletion of any audio information that is older than the selected time period.

In further embodiments, a control input 30C may comprise a pressure switch which may be activated once an individual rests their hand on a firearm to which the apparatus 101 is attached when the firearm is in a holster. By resting their hand on the firearm, the pressure switch control input 30C may be configured to activate by the added pressure and electronically communicate to a processor 22 and/or a microphone 30B to begin recording audio information which may optionally be stored in a loop fashion.

Figure 11:
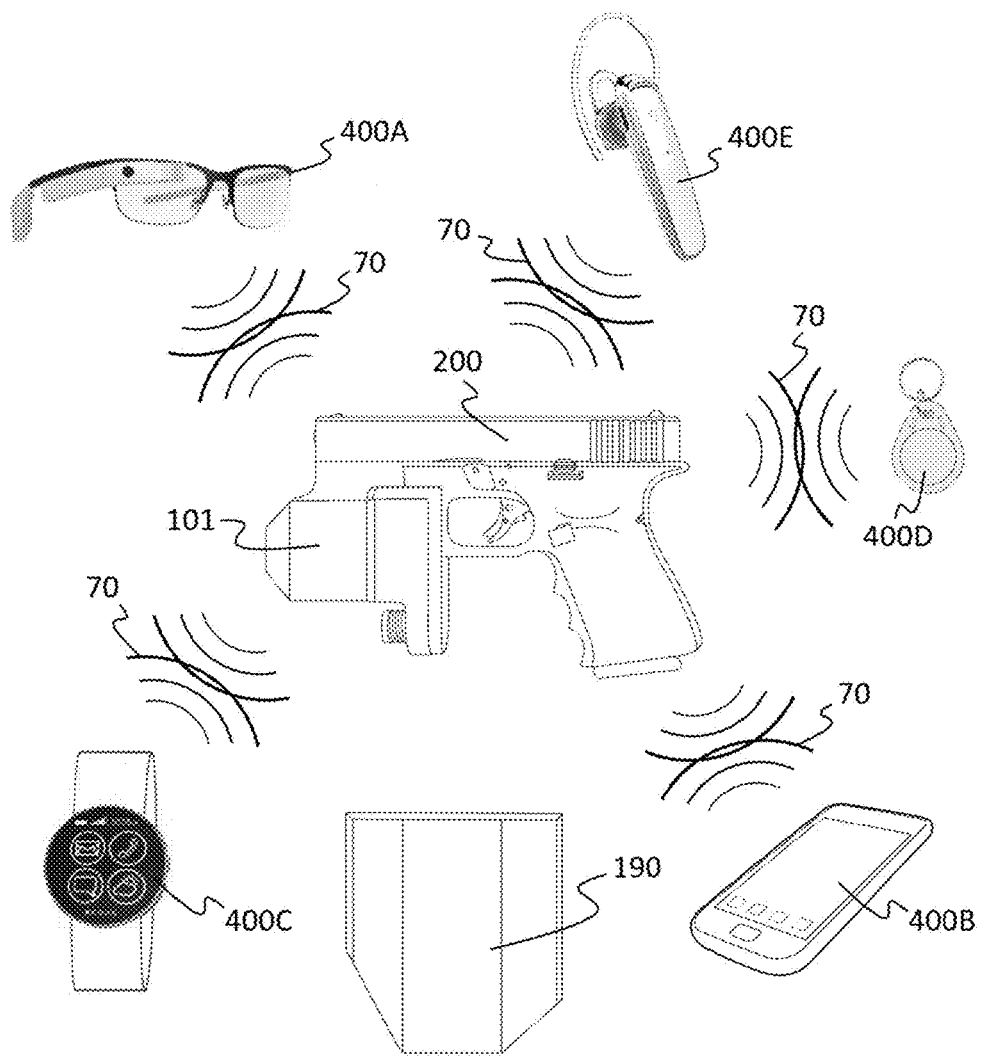
FIG. 11 illustrates a perspective view of an example of a firearm environmental recording apparatus in wireless communication with client devices according to various embodiments described herein.

FIG. 11 depicts an example of a firearm environmental recording apparatus 101 which may optionally be in wireless communication 70 with one or more client devices 400A, 400B, 400C, 400D, 400E, according to various embodiments described herein. In some embodiments, a processing unit 21 and network interface 23 may be used to record and process data from the input/output interfaces 30 or any other sensor and to communicate the data from the one or more input/output interfaces 30 to one or more external access client devices 400, such as smart watches 400A, cell phones, smart phones 400B, computers, such as tablet computers, laptop computers, wearable computers 400C, such as Google Glasses, and the like, key fobs 400D or other small radio transceiver devices, ear buds 400E or other small wearable radio transceiver devices.

In some embodiments, a processing unit 21 and network interface 23 may communicate data from an input/output interface 30 directly to external access client 400A, 400B, 400C, devices through Bluetooth, Wifi, NFC, or other wireless communications, thereby allowing the data to be displayed by an external access client device 400A, 400B, 400C, 400D, 400E, and/or triggering a notification such as a text message, email message, push notification, application notification, and the like on an external access client device 400A, 400B, 400C, 400D, 400E. In other embodiments, a processing unit 21 and network interface 23 may communicate data over a wired or wireless network to external access client devices 400A, 400B, 400C, 400D, 400E, thereby outputting data from one or more input/output interfaces 30 to be displayed by an external access client device 400A, 400B, 400C, 400D, 400E, and/or triggering a notification such as a text message, email message, push notification, application notification, and the like on an external access client device 400A, 400B, 400C, 400D, 400E. For example, the network interface 23 may send alerts to call centers in the area or even to the local nearest police officer so someone in distress could be using the watch to send out calls for help while recording the local events in the process for later justification.

In some embodiments, the network interface 23 may optionally be in wireless communication with an external access client device 400A, 400B, 400C, 400D, 400E, and the external access client device 400A, 400B, 400C, 400D, 400E, may act as a display screen or view finder to display data from one or more input/output interfaces 30. In further embodiments, the network interface 23 may optionally be in wireless communication with an external access client device 400A, 400B, 400C, 400D, 400E, and the external access client device 400A, 400B, 400C, 400D, 400E, may act as a communicator allowing the user to send and receive voice data through the input/output interfaces of the external access client device 400A, 400B, 400C, 400D, 400E, to the apparatus 101. In further embodiments, the network interface 23 may optionally be in wireless communication with an external access client device 400A, 400B, 400C, 400D, 400E, and the input/output interfaces of the external access client device 400A, 400B, 400C, 400D, 400E, may be used to perform facial recognition or other biometric analysis on a user holding a firearm 200 with the apparatus 101 attached.

In some embodiments, the network interface 23 may optionally be in wireless communication with an external access client device 400A, 400B, 400C, 400D, 400E, and data such as statistical data from apparatus 101, such as a shot counter function, may be transmitted by the apparatus 101 to be displayed on the external access client device 400A, 400B, 400C, 400D, 400E. In further embodiments, the network interface 23 may optionally be in wireless communication with an external access client device 400A, 400B, 400C, 400D, 400E, and an image or series of images generated by an input/output interface 30 may be displayed on the external access client device 400A, 400B, 400C, 400D, 400E. In further embodiments, data generated by an input/output interface 30 may optionally be displayed on the external access client device 400A, 400B, 400C, 400D, 400E.

In further embodiments, the system 100 may comprise a key fob 400D and/or an ear bud 400E, which may comprise biometric sensors capable or measuring biometric data of a user 102. Preferably, a key fob 400D and/or an ear bud 400E may be configured with haptic and acoustics feedback to communicate with the user 102 and/or to allow the user 102 to communicate with an apparatus 101 optionally via sound or haptic personalized code. In further embodiments, a key fob 400D and/or an ear bud 400E may also provide biometrics data to show human in fight or flight emotional states where subconscious mind overrides conscious mind to ensure all possibilities of human survival in a life or death situation. These human emotions and natural human body phenomena can be recorded using hardware and software sensor technology, to be submitted in a virtually comprehendible fashion via the system 100 for the Justice Department, Court of Laws, or any other entity for review to prove that a user 102 of an apparatus 101 acted in accordance with all laws and of fear for their lives in the event that they are forced to use lethal force with an apparatus 101 equipped firearm 200, their body, or other technology to defend one's life from lethal threats.

In further embodiments, the system 100 may comprise a holster 190 which may be immersive with a desired apparatus 101 in processing functionality, data storage, and/or battery power storage. In preferred embodiments, a holster 190 may be secured with a Faraday Cage or other mechanical and/or electrical device which may be configured to prevent an electronic breach of personal identities and personal information, such as social security numbers, driver license numbers, personalized data, from the apparatus 101 and/or holster 190. Preferably, a holster 190 may be verifiably owned by a desired user 102 or by algorithms of data stored on the apparatus 101 and/or holster 190, to secure an apparatus 101 with network capability from any connection using the Faraday cage techniques or other invented wireless force field digital and/or wireless signal deflection technologies.

Figure 12:
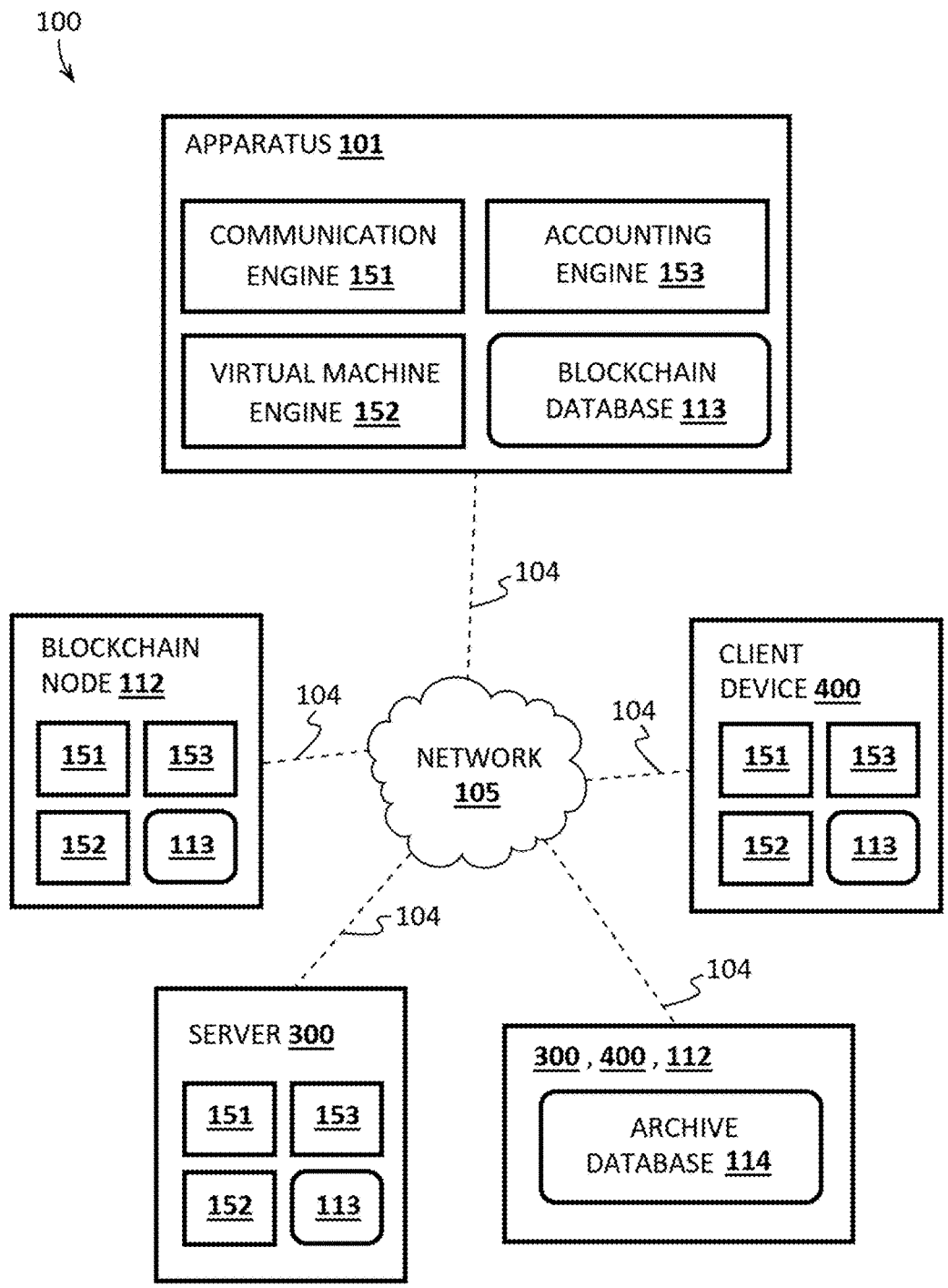
FIG. 12 shows a block diagram illustrating some applications and databases of a firearm environmental recording system which may function as software rules engines according to various embodiments described herein.

Referring now to FIG. 12, a block diagram showing some software rules engines and databases which may be found in a system 100. In some embodiments, the system 100 may comprise a communication engine 151, a virtual machine engine 152, and/or an accounting engine 153. The engines 151, 152, 153, may comprise one or more of the programs 28 of an apparatus 101, programs 320 of a server 300, and/or programs 420 of a client device 400. Preferably, the system 100 may comprise a blockchain network 111 comprising one or more nodes 112 in which one or more apparatuses 101, servers 300, and/or client devices 400 may function as or comprise one or more of the nodes 112. Each node 112 of the blockchain network 111 may maintain a blockchain database 113 which may comprise a distributed ledger of the blockchain network 111. One or more of the engines 151, 152, 153, may read, write, or otherwise access data in the blockchain database(s) 113 of the system 100. Additionally, the engines 151, 152, 153, may be in electronic communication so that data may be readily exchanged between the engines 151, 152, 153. It should be understood that the functions attributed to the engines 151, 152, 153, described herein are exemplary in nature, and that in alternative embodiments, any function attributed to any engine 151, 152, 153, may be performed by one or more other engines 151, 152, 153, or any other suitable processor logic.

The communication application 151 may comprise or function as communication logic stored in memory 25, 310, 410 which may be executable by the processor 22, 302, 402, of an apparatus 101, server 300 and/or client device 400. The communication application 151 may be configured to govern electronic communication between the apparatuses 101, severs 300, and client devices 400 of the system 100. Preferably, a communication application 151 may enable the apparatus 101, server 300 and/or client device 400 running the communication application 151 to communicate directly or indirectly via a network 105 with the communication application 151 of another apparatus 101, server 300 and/or client device 400 of the system 100.

The virtual machine engine 152 may comprise or function as virtual machine logic stored in memory 25, 310, 410 which may be executable by the processor 22, 302, 402, of an apparatus 101, server 300 and/or client device 400. Each node 112 may comprise a virtual machine engine 152, and the virtual machine engine 152 may manage and perform data transactions on the blockchain database 113 of the node 112. Generally, a virtual machine engine 152 may be run by a processor 22, 302, 402, of a node 112, and may maintain a distributed ledger (copy of the blockchain database 113) on its memory 25, 31, 410, and may thus synchronize transaction data with other nodes 112 containing the distributed ledger in order to implement a block chain based transaction processing system 100.

In some embodiments, the virtual machine engine 152 may be configured to incorporate the image data from a camera 30A, audio data from a microphone 30B, and/or orientation data from an inertial sensor module 30J of an apparatus 101 into a blockchain database 113 of a node 112. In preferred embodiments, the virtual machine engine 152 may be configured to encrypt, such as via the SHA256 computational algorithm, the image data from a camera 30A, audio data from a microphone 30B, orientation data from an inertial sensor module 30J, and/or data recorded by any other I/O interface 30 of an apparatus 101. In still further preferred embodiments, the virtual machine engine 152 may be configured to perform a cryptographic hash function, such as via the SHA256 computational algorithm, on the image data from a camera 30A, audio data from a microphone 30B, and/or orientation data from an inertial sensor module 30J, and/or data recorded by any other I/O interface 30 of an apparatus 101.

In further embodiments, the virtual machine engine 152 may be configured to perform data transactions in the blockchain network 111 and its associated blockchain database 113. Data transactions may include transmitting data, such as data recorded by an I/O interface 30 of an apparatus 101, to one or more other nodes 112, receiving data from one or more other nodes 112, encrypting data, decrypting data, providing consensus of a finding (for example, data is encrypted properly etc.), communicating from one apparatus 101 to another apparatus 101 (peer to peer communication), and any other data manipulations commonly performed by a node 112 of a blockchain network 111.

The accounting engine 153 may comprise or function as accounting logic stored in memory 25, 310, 410 which may be executable by the processor 22, 302, 402, of an apparatus 101, server 300 and/or client device 400. Generally, the accounting engine 153 may function as a digital cryptocurrency wallet for storing the public and private keys which can be used to perform data transactions and to receive or spend the cryptocurrency and its associated tokens. The cryptocurrency of the system 100 is decentrally stored and maintained in the blockchain database 113. Every piece of cryptocurrency has a private key. With the private key, it is possible to write in the blockchain database 113, effectively spending the associated cryptocurrency. The accounting engine 153 may function or provide a digital which wallet for management of cryptocurrency, such as, but not limited to TRIG Token, Bitcoin, Ether, Litecoin, Monero, Ripple, MaidSafeCoin, Lisk, and Storjcoin X.

In some embodiments, the system 100 may comprise one or more blockchain databases 113. A blockchain database 113 may comprise a distributed ledger in which a copy of the blockchain database 113 is stored and maintained by one or more nodes 112 of a blockchain network 111. In some embodiments, the data of a blockchain databases 113 may be maintained as a continuously growing ledger or listing of the data, which may be referred to as blocks, secured from tampering and revision. Each block includes a timestamp and a link to a previous block. In preferred embodiments, each block may also comprise a cryptographic hash of a set of data, an identifier the apparatus 101 that recorded the data, and an identifier of a recipient of the recorded data, such as an archive database 114 or node 112 of the system 100. In some embodiments, each block may comprise data recorded by an apparatus 101. Through the use of a peer-to-peer blockchain network 111 and a distributed timestamping server 300, a blockchain database 113 may be managed autonomously. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction data input results in a different hash value being computed, which indicates potentially compromised transaction input. Digital signatures ensure that data entry transactions (data added to the blockchain database 1113) originated from senders (signed with private keys) and not imposters. At its core, a blockchain database 113 may record the chronological order of data entry transactions with all nodes 112 agreeing to the validity of entry transactions using the chosen consensus model. The result is data entry transactions that are irreversible and agreed to by all members in the blockchain network 111.

In some embodiments, the system 100 may comprise one or more archive databases 114. An archive database 114 may be stored in a data store 24, 308, 408, or memory 25, 310, 410, by one or more apparatuses 101, servers 300, client devices 400, and/or nodes 112 of the system 100. In preferred embodiments, an archive database 114 may store data recorded by an apparatus 101, which may be encrypted, for secure storage and retrieval. In some embodiments, an archive database 114 may be used to store data recorded one or more apparatuses 101 should the recorded data be too large to be stored in a blockchain database 113 of the system. In some embodiments, an archive database 114 may be used to store data recorded one or more apparatuses 101 should the recorded data be too large to stored in a data store 24, 308, 408, of the system 100. In further embodiments, data stored in an archive database 114 may only be accessed using public/private key cryptography.

In preferred embodiments, the system 100 uses blockchain based cryptocurrency technologies for securing various transactions associated with data processing. The system 100 may comprise an apparatus 101 having one or more sensors or I/O interfaces 30 which may record data describing a firearm 200 and the environment of the firearm 200. The apparatus 101, and therefore the firearm 200 to which it is coupled, may be equipped with processing, storage and network capabilities via the processing unit 21. A memory 25 may contain a blockchain database 113 (distributed ledger) and an accounting engine 153 functioning as a cryptographic wallet. Initially, the user 102 of the apparatus 101 may load a starting amount of cryptocurrency into the cryptographic wallet. The cryptocurrency may then be used by the apparatus 101 to conduct transactions on the blockchain network 111. Data recorded by the I/O interfaces 30 may be encrypted, preferably via a quantum generated string, by a virtual machine engine 152 and/or the virtual machine engine 152 may perform a cryptographic hash function on the data before and/or after encryption. In some embodiments, the hash value may be added to a copy of the blockchain database 113, stored locally on the apparatus 101 or stored on a server 300 or client device 400, and the copy of the blockchain database 113 may be communicated to other nodes 112 to propagate the data stored on the local ledgers to other nodes 112 which may then sync their ledger (copy of the blockchain database 113).

In further embodiments, the virtual machine engine 152 of the one or more nodes 112 may validate the data (preferably image data, audio data, and orientation data recorded by an apparatus 101), such as by achieving consensus that the data is encrypted, and the validating node 112 (optionally an apparatus 101) may be rewarded with cryptocurrency tokens via the accounting engine 153. The private key of the rewarded token(s) may be stored in a secured digital wallet, via the accounting engine 153 of the respective node 112, that may be managed with the credentials of a private SHA-256 encrypted key. For example, at a given time, 100 mm tokens may exist in total in the distributed ledger blockchain database 113. All nodes 112 have an accounting engine 153 which enables the nodes 112 to be rewarded (or earn 'tokens') for the virtual machine engine 152 of the respective node 112 performing encryption consensus work. In still further embodiments, the accounting engine 153 of a first node 112 may be configured to receive a private key of a token from a second node 112 of the blockchain network 11 in response to the virtual machine engine 152 of the first node 112 validating image data, audio data, and orientation data encrypted by another node 112, such as the second node 112 of the blockchain network 111.

Further, the rewards may also be received by an apparatus 101 for storing data, such as image data, audio data, and orientation recorded by an apparatus 101 from another networked device 101, 300, 400, (called proof of storage) and for retrieving data (proof of delivery). In further embodiments, the accounting engine 153 of a node 112 may be configured to receive a private key of a token from another node 112 of the blockchain network 111 in response to the blockchain database 113 being stored in the memory of the apparatus 101. The private key of the rewarded token(s) may be stored in a secured digital wallet, via the accounting engine 153 of the respective node 112, that may be managed with the credentials of a private SHA-256 encrypted key.

In still further embodiments, the accounting engine 153 may be configured for storing the public and private keys which can be used to provide an encrypted end-to-end messaging system that enables apparatuses 101 of the system 100 to communicate with other apparatuses 101 sharing the same private key instantly via their respective communication engine 151. The encrypted private mesh networking protocol may be used for notifications or system commands.

In further embodiments, one or more engines 151, 152, 153, and databases 113, 114, may be downloadable by a client device 400, such as a smart phone, and other acoustics receiving laws of nature computation devices to build a firearm acoustic location and heat and/or human emotion mapping technology with Identification, friend or foe (IFF) system integration with encrypted data transmission and receiving which may be used to determine friend or enemy on the battle field or other combat arena.

In some embodiments, an apparatus 101 may communicate with a client device 400 for control purpose as the apparatus 101 may have no control inputs 30C, interaction switches or buttons. Optionally, an apparatus 101 may simply comprise one or more sensors, such as an inertial sensor module 30J, which may measure the forces and/or other laws of nature which may act on the apparatus 101, and the measured forces and/or other laws of nature may then be made sense of by human-generated sensor technologies that record, produce and build library databases of environmentally human and electronically sensed naturally occurring experiences that can be measured against a proven scale using the laws of math and physics. For example, an apparatus 101 may comprise one or more I/O interfaces 30 which may record Human Voice sounds and Mechanically Built Device sounds such as a firearm 200 and any unique sounds produced by its operation and functionalities including the discharging of ammunition. This data may be recorded, verified, data logged, and stored to be used as use cases for the data are developed with merit that values in a currency or token on the blockchain database 113 to be mined and used for other use case purposes, such as client device 400 applications are built. Optionally, users 102 may use verified sensor data to build intelligent virtual reality applications with the apparatus 101 which may use human and naturally occurring sounds of nature.

Figure 13:
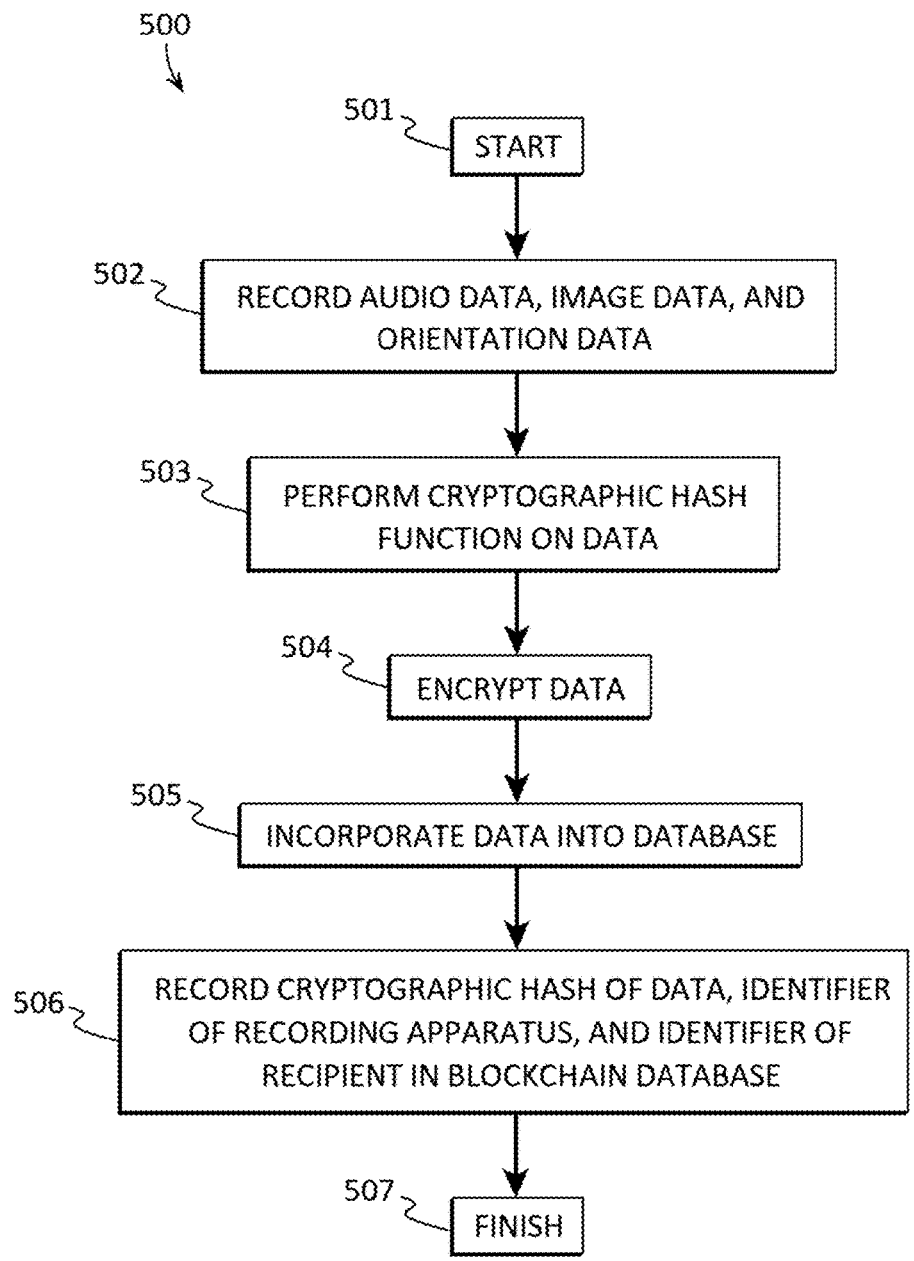
FIG. 13 depicts a block diagram of an example method for providing a chain of trust and the integrity of data recorded by the one or more firearm environmental recording apparatuses according to various embodiments described herein.

FIG. 13 illustrates a block diagram of an example method for providing a chain of trust and the integrity of data recorded by the one or more firearm environmental recording apparatuses ("the method") 500 according to various embodiments described herein. In some embodiments, the method 500 may be used to enable data recorded by the apparatuses 101 of the system 100 to be securely stored in a database, such as a blockchain database 113 and/or an archive database 114. One or more steps of the method 500 may be performed by a communication engine 151, a virtual machine engine 152, and/or an accounting engine 153 which may be executed by one or more computing device processors 22, 302, 402, of the system 100.

In some embodiments, the method 500 may start 501 and data may be recorded by one or more I/O interfaces 30 of an apparatus 101 in step 502. In preferred embodiments, the data may include audio data recorded by a microphone 30B, image data recorded by a camera 30A, and/or orientation data recorded by an inertial sensor module 30J. The data may describe the variables in the environment around the firearm 200 to which the apparatus 101 is coupled to, and/or the data may describe variables of the firearm 200 to which the apparatus 101 is coupled to.

In step 503, a cryptographic hash function may be performed on the data. In preferred embodiments, the cryptographic hash function may be performed by a virtual machine engine 152 running on the apparatus 101 that recorded the data. In further embodiments, the cryptographic hash function may be performed by a virtual machine engine 152 running on any node 112 of the system 100, such as a server 300, client device 400, or other apparatus 101 of the system 100.

In step 504, the data may be encrypted. In preferred embodiments, the encryption of the data may be performed by a virtual machine engine 152 running on the apparatus 101 that recorded the data. In further embodiments, the encryption of the data may be performed by a virtual machine engine 152 running on any node 112 of the system 100, such as a server 300, client device 400, or other apparatus 101 of the system 100.

In step 505, the data may be incorporated into one or more databases. In some embodiments, the data may be incorporated into an archive database 114. In further embodiments, the data may be incorporated into a blockchain database 113. A communication engine 151 and a virtual machine engine 152 preferably may be configured to incorporate the data into a desired database 113, 114.

It should be understood that while the steps of the method 500 are numbered sequentially, the method 500 is not limited to having steps 503, 504, and 505 performed in a sequential order. In some embodiments, step 504 may be performed before step 503. In further embodiments, step 504 may be performed after step 505. In still further embodiments, step 503 may be performed after step 504. In further embodiments, step 503 may be performed after step 505. Additionally, one or more of steps 503, 504, and 505 may be performed two or more times before the method 500 is finished 507. For example, the method 500 may comprise step 503 being performed after step 502, after step 504, and after step 505.

In step 506, a cryptographic hash of the data, an identifier of the apparatus 101 that recorded the data, and an identifier of a recipient of the data may be recorded in a block of the blockchain database 113. A recipient may comprise a node 112, server 300, apparatus 101, client device 400, archive database 114, or blockchain database 113 to which the data recorded by an apparatus 101 may be sent or otherwise provided access. In further embodiments, an identifier of a node 112, server 300, apparatus 101, or client device 400 which provided the data to a recipient may also be recorded in a block of the blockchain database 113. In preferred embodiments, an identifier of an apparatus 101 and/or recipient may comprise a public or private cryptographic key. By storing the cryptographic hash of the recorded data, the identifier of the recording apparatus 101, and the chain of custody of the recorded data, via the identifiers of the entities (300, 400, 101, 113, 114) that had access to the data, in a blockchain database 113, a chain of trust and the integrity of data recorded by the one or more apparatuses 101 of the system 100 may be created and maintained. After step 506, the method 500 may finish 507.

Figure 14:
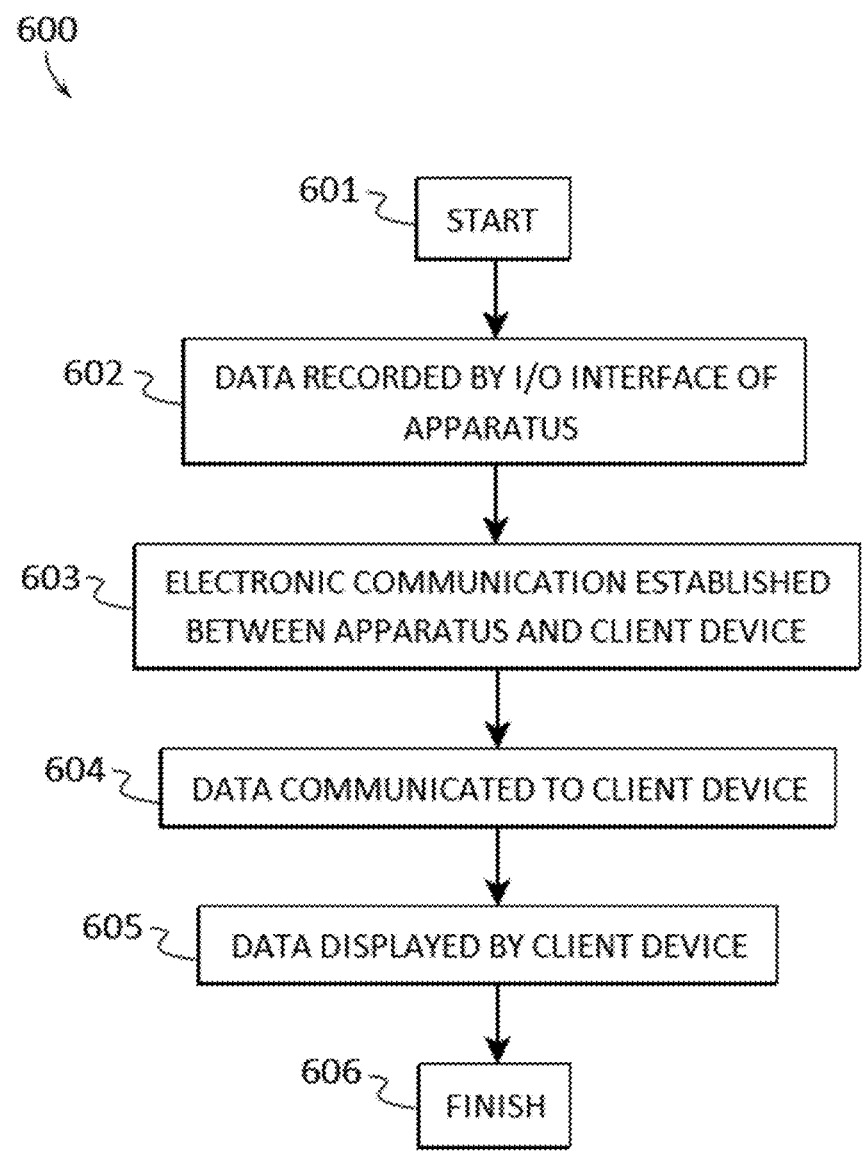
FIG. 14 illustrates a block diagram of an example method for displaying data recorded by a firearm environmental recording apparatus on a client device according to various embodiments described herein.

FIG. 14 illustrates a block diagram of an example method for displaying data recorded by a firearm environmental recording apparatus on a client device ("the method") 600 according to various embodiments described herein. In some embodiments, the method 600 may start 601 and data may be recorded by one or more optional input/output interfaces 30 of a firearm environmental recording apparatus 101 in step 602. In further embodiments, data may be recorded by a camera 30A, microphone 30B, control input 30C, laser light emitting element 30D, led light emitting element 30E, accelerometer 30H, ten Degrees of Freedom Circuit Board 30J, thermal sensor 30K, GPS sensor 30L, ultrasonic sensor 30M, LIDAR sensor 30P, and/or any other component of the apparatus 101.

In step 603, electronic communication may be established between the apparatus 101 and a client device 400A, 400B, 400C. In further embodiments, a network connection 104, such as wireless communication 70, may be established between the apparatus 101 and a client device 400A, 400B, 400C, such as between the network interface 23 of the apparatus 101 and the radio 406 of a client device 400A, 400B, 400C. In still further embodiments, wired electronic communication may be established between the apparatus 101 and a client device 400A, 400B, 400C. In alternative embodiments, step 303 may be performed before or at the same time as step 602.

Once electronic communication is established, data from the apparatus 101 may be electronically communicated to the client device 400A, 400B, 400C, in step 604. The data may be displayed on the client device 400A, 400B, 400C, such as on a display screen or other display I/O interface 404 of the client device 400A, 400B, 400C, in step 605. For example, data from the camera 30A of the apparatus 101 may be electronically communicated to the client device 400A, 400C, in step 605, to be displayed on a wearable display of a wearable client device 400A, 400C, to allow the user to remain behind cover while only the camera 30A of the apparatus 101 is exposed from cover. Once the desired data is displayed in step 605, step 605 may be repeated any number of times to display further data or the method may finish 606.

Figure 15:
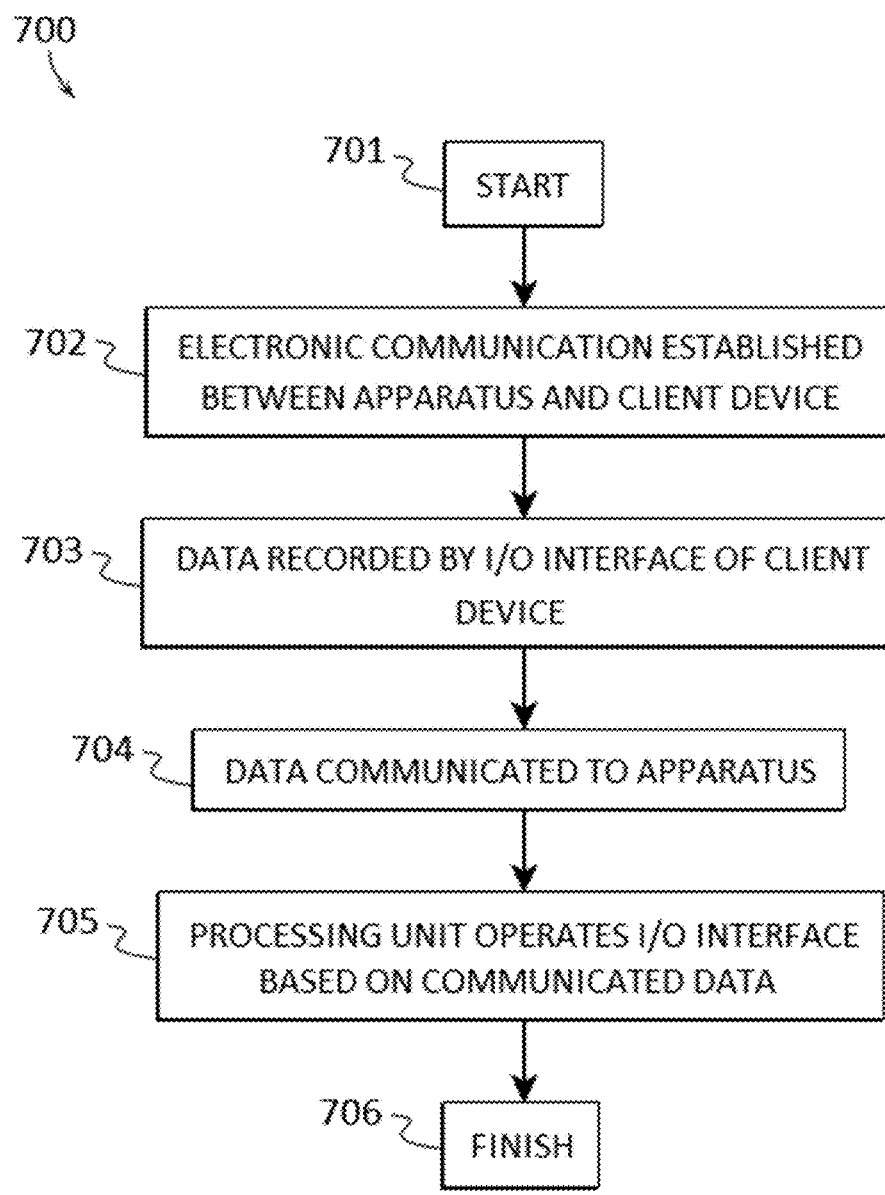
FIG. 15 shows a block diagram of an example method for operating a firearm environmental recording apparatus with data provided by a client device according to various embodiments described herein.

FIG. 15 shows a block diagram of an example method for operating a firearm environmental recording apparatus with data provided by a client device ("the method") 700 according to various embodiments described herein. In some embodiments, the method 700 may start 701 and electronic communication may be established between the apparatus 101 and a client device 400A, 400B, 400C, in step 702. In further embodiments, electronic wireless communication 70 may be established between the apparatus 101 and a client device 400A, 400B, 400C, such as between the network interface 23 of the apparatus 101 and the radio 406 of a client device 400A, 400B, 400C. In still further embodiments, wired electronic communication may be established between the apparatus 101 and a client device 400A, 400B, 400C.

In step 703 data may be recorded by one or more input/output interfaces 404 of a client device 400A, 400B, 400C. In further embodiments, data may be recorded by a camera 30A, microphone 30B, control input 30C, accelerometer 30H, inertial sensor module 30J, thermal sensor 30K, GPS sensor 30L, ultrasonic sensor 30M, and/or any other component of a client device 400A, 400B, 400C. In alternative embodiments, step 703 may be performed before or at the same time as step 702.

In step 704, data from the client device 400A, 400B, 400C, may be electronically communicated to the apparatus 101. The data may be electronically communicated from the radio 406 of a client device 400A, 400B, 400C, to the network interface 23 of the apparatus 101 and to the processing unit 21 through a local interface 26.

In step 705, the processing unit 21 of the apparatus 101 may operate one or more input/output interfaces 30 of the apparatus 101 based on the data communicated from the client device 400A, 400B, 400C. In further embodiments, the processing unit 21 of the apparatus 101 may operate one or more cameras 30A, microphones 30B, control inputs 30C, laser light emitting elements 30D, LED light emitting elements 30E, accelerometers 30H, inertial sensor module 30J, thermal sensors 30K, GPS sensors 30L, ultrasonic sensors 30M, LIDAR sensor 30P, and/or any other component of the apparatus 101 based on the data communicated from the client device 400A, 400B, 400C. For example, based on the data communicated from the client device 400A, 400B, 400C, the processing unit 21 may activate the camera 30A to record using night vision settings. In another example, based on the data communicated from the client device 400A, 400B, 400C, the processing unit may activate the LED light emitting element 30D to activate in a strobe pattern to disorient attackers or people the LED light emitting element 30D is directed towards. Once a desired input/output interface 30 has been operated, step 705 may be repeated any number of times to operate other input/output interfaces 30 or the method 700 may finish 706.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A firearm environmental recording apparatus, the apparatus comprising:
a body comprising:
a processing unit having a processor, network interface, and a memory
a camera in communication with the processing unit, the camera configured to record image data;
a microphone in communication with the processing unit, the microphone configured to record audio data;
an inertial sensor module in communication with the processing unit, the inertial sensor module configured to provide to orientation data;
a blockchain database of a blockchain network, the blockchain database stored in the memory;
communication logic stored in the memory, executable by the processor and configured to communicate the image data, audio data, and orientation data to the blockchain network via the network interface;
a firearm attachment structure configured to attach to portions of a firearm, the firearm attachment structure comprising a first rail receiver and a second rail receiver, wherein the body is coupled to the firearm attachment structure.

2. The apparatus of claim 1, wherein the apparatus is a node of the blockchain network.

3. The apparatus of claim 1, further comprising a virtual machine logic stored in the memory, executable by the processor and configured to perform a cryptographic hash function on the image data, audio data, and orientation data.

4. The apparatus of claim 3, wherein the virtual machine logic is configured to encrypt the image data, audio data, and orientation data.

5. The apparatus of claim 4, further comprising accounting logic stored in the memory, executable by the processor and configured to provide a private key of a token to a node of the blockchain network that validates the image data, audio data, and orientation data encrypted by the virtual machine logic.

6. The apparatus of claim 4, wherein the virtual machine logic validates image data, audio data, and orientation data encrypted by a node of the blockchain network.

7. The apparatus of claim 6, further comprising accounting logic stored in the memory, executable by the processor and configured to receive a private key of a token from a node of the blockchain network in response to the virtual machine logic validating image data, audio data, and orientation data encrypted by the node of the blockchain network.

8. The apparatus of claim 1, further comprising accounting logic stored in the memory, executable by the processor and configured to receive a private key of a token from another node the blockchain network in response to the blockchain database being stored in the memory of the apparatus.

9. The apparatus of claim 1, wherein the network interface comprises a radio.

10. The apparatus of claim 1, wherein the inertial sensor module comprises a ten degrees of freedom inertial sensor module.

11. A firearm environmental recording system, the system comprising:
a blockchain database maintained by a blockchain network, the blockchain network comprising two or more nodes, wherein each node comprises: a processing unit having a processor, network interface, and a memory;
a firearm environmental recording apparatus, the apparatus having: a processing unit having a processor, network interface, and a memory; a camera in communication with the processing unit, the camera configured to record image data; a microphone in communication with the processing unit, the microphone configured to record audio data;
an inertial sensor module in communication with the processing unit, the inertial sensor module configured to provide to orientation data; a body housing the camera; and a firearm attachment structure removably coupled to the body and configured to attach to portions of a firearm, the firearm attachment structure comprising a first rail receiver and a second rail receiver;
a communication logic stored in the memory of the firearm environmental recording apparatus, the communication logic executable by the processor of the firearm environmental recording apparatus and configured to communicate the image data, audio data, and orientation data to the blockchain network via the network interface; and
a virtual machine logic stored in a memory, executable by a processor and configured to incorporate the image data, audio data, and orientation data into the blockchain database.

12. The system of claim 11, wherein the firearm environmental recording apparatus is a node of the blockchain network.

13. The system of claim 11, wherein the firearm environmental recording apparatus comprises a virtual machine logic stored in the memory of the firearm environmental recording apparatus, executable by the processor of the firearm environmental recording apparatus and configured to perform a cryptographic hash function on the image data, audio data, and orientation data.

14. The system of claim 13, wherein the virtual machine logic of the firearm environmental recording apparatus is configured to encrypt the image data, audio data, and orientation data.

15. The system of claim 14, wherein the firearm environmental recording apparatus further comprises accounting logic stored in the memory, executable by the processor and configured to provide a private key of a token to a node of the blockchain network that validates the image data, audio data, and orientation data encrypted by a virtual machine logic.

16. The system of claim 14, wherein the virtual machine logic of the firearm environmental recording apparatus validates image data, audio data, and orientation data encrypted by a node of the blockchain network.

17. The system of claim 16, wherein the firearm environmental recording apparatus further comprises accounting logic stored in the memory of the firearm environmental recording apparatus, executable by the processor of the firearm environmental recording apparatus and configured to receive a private key of a token from a node of the blockchain network in response to the virtual machine logic of the firearm environmental recording apparatus validating image data, audio data, and orientation data encrypted by the node of the blockchain network.

18. The system of claim 11, wherein the firearm environmental recording apparatus further comprises accounting logic stored in the memory of the firearm environmental recording apparatus, executable by the processor of the firearm environmental recording apparatus and configured to receive a private key of a token from another node of the blockchain network in response to the blockchain database being stored in the memory of the firearm environmental recording apparatus.

19. The system of claim 11, wherein the network interface of the firearm environmental recording apparatus comprises a radio.

20. The system of claim 11, wherein the inertial sensor module the firearm environmental recording apparatus comprises a ten degrees of freedom inertial sensor module.

* * * * *